United States Patent
Li et al.

(10) Patent No.: US 11,792,732 B2
(45) Date of Patent: Oct. 17, 2023

(54) WAKE UP INDICATION FOR MONITORING SIDELINK DISCONTINUOUS RECEPTION (DRX)

(71) Applicant: QUALCOMM Incorporated, San Diego, CA (US)

(72) Inventors: Qing Li, Princeton Junction, NJ (US); Hong Cheng, Basking Ridge, NJ (US); Ozcan Ozturk, San Diego, CA (US); Gavin Bernard Horn, La Jolla, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 17/447,120

(22) Filed: Sep. 8, 2021

(65) Prior Publication Data
US 2022/0095232 A1    Mar. 24, 2022

Related U.S. Application Data

(60) Provisional application No. 63/080,301, filed on Sep. 18, 2020.

(51) Int. Cl.
*H04W 52/02* (2009.01)
*H04W 72/0453* (2023.01)
(Continued)

(52) U.S. Cl.
CPC ... *H04W 52/0235* (2013.01); *H04W 72/0453* (2013.01); *H04W 72/20* (2023.01); *H04W 76/28* (2018.02)

(58) Field of Classification Search
CPC ......... H04W 52/0235; H04W 72/0453; H04W 72/20; H04W 76/28; H04W 76/14; H04W 92/18; Y02D 30/70
See application file for complete search history.

(56) References Cited

U.S. PATENT DOCUMENTS

| 2020/0092814 A1* | 3/2020 | Zhou | H04W 52/0235 |
| 2021/0227604 A1* | 7/2021 | Huang | H04W 72/02 |

(Continued)

OTHER PUBLICATIONS

3GPP TSG RAN WG1 Meeting #102-E; R1-2005896; Source: Intel Corporation; Title: Sidelink enhancements for UE power saving; e-Meeting, Aug. 17-28, 2020. (Year: 2020).*

(Continued)

*Primary Examiner* — Mohammed S Chowdhury
(74) *Attorney, Agent, or Firm* — Patterson + Sheridan, L.L.P

(57) ABSTRACT

Certain aspects provide a method for wireless communication by a user equipment (UE). The method generally includes determining one or more sidelink discontinuous reception (DRX) configurations associated with at least a communication on a sidelink, determining a wake up indication configuration associated with the one or more sidelink DRX configurations, monitoring for at least one wake up indication from at least one other UE based on the wake up indication configuration, the at least one wake up indication indicating a sidelink DRX on phase associated with the sidelink DRX configuration, deciding an action for the sidelink DRX on phase based on the at least one wake up indication for the at least one communication on the sidelink, and performing the action in accordance with the decision.

29 Claims, 14 Drawing Sheets

(51) Int. Cl.
*H04W 76/28* (2018.01)
*H04W 72/20* (2023.01)

(56) References Cited

U.S. PATENT DOCUMENTS

| | | | |
|---|---|---|---|
| 2022/0022279 A1* | 1/2022 | Kim | H04W 72/23 |
| 2022/0353815 A1* | 11/2022 | Lin | H04W 52/0232 |
| 2022/0418036 A1* | 12/2022 | Back | H04W 76/28 |
| 2023/0063472 A1* | 3/2023 | Freda | H04W 76/28 |

OTHER PUBLICATIONS

LG Electronics: "New WID on NR Sidelink Enhancement," 3GPP TSG RAN Meeting #86, RP-193231 (revision of RP-193134), Sitges, Spain, Dec. 9-12, 2019, 6 Pages.

* cited by examiner

WAKE UP INDICATION FOR MONITORING SIDELINK DISCONTINUOUS RECEPTION (DRX)

CROSS-REFERENCE TO RELATED APPLICATION

This application claims benefit of and priority to U.S. Provisional Application No. 63/080,301 filed Sep. 18, 2020, which is hereby expressly incorporated by reference herein in its entirety as if fully set forth below and for all applicable purposes.

INTRODUCTION

Aspects of the present disclosure relate to wireless communications, and more particularly, to techniques for sidelink communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved feedback signaling and improved power consumption.

Certain aspects provide a method for wireless communication by a user equipment (UE). The method generally includes determining one or more sidelink discontinuous reception (DRX) configurations associated with at least a communication on sidelink, determining a wake up indication configuration associated with the one or more sidelink DRX configurations, monitoring for at least one wake up indication from at least one other UE based on the wake up indication configuration, the at least one wake up indication indicating a sidelink DRX on phase associated with the sidelink DRX configuration, deciding an action for the sidelink DRX on phase based on the at least one wake up indication for the at least one communication on sidelink, and performing the action in accordance with the decision.

Certain aspects provide a method for wireless communication by a UE. The method generally includes determining one or more sidelink DRX configurations associated with at least one communication on sidelink, determining a wake up indication configuration associated with the one or more sidelink DRX configurations, deciding an action for a sidelink DRX on phase associated with the one or more sidelink DRX configurations, and transmitting based on the wake up indication configuration, to at least one other UE, at least one wake up indication indicating the action for the sidelink DRX on phase for at least one communication on the sidelink.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
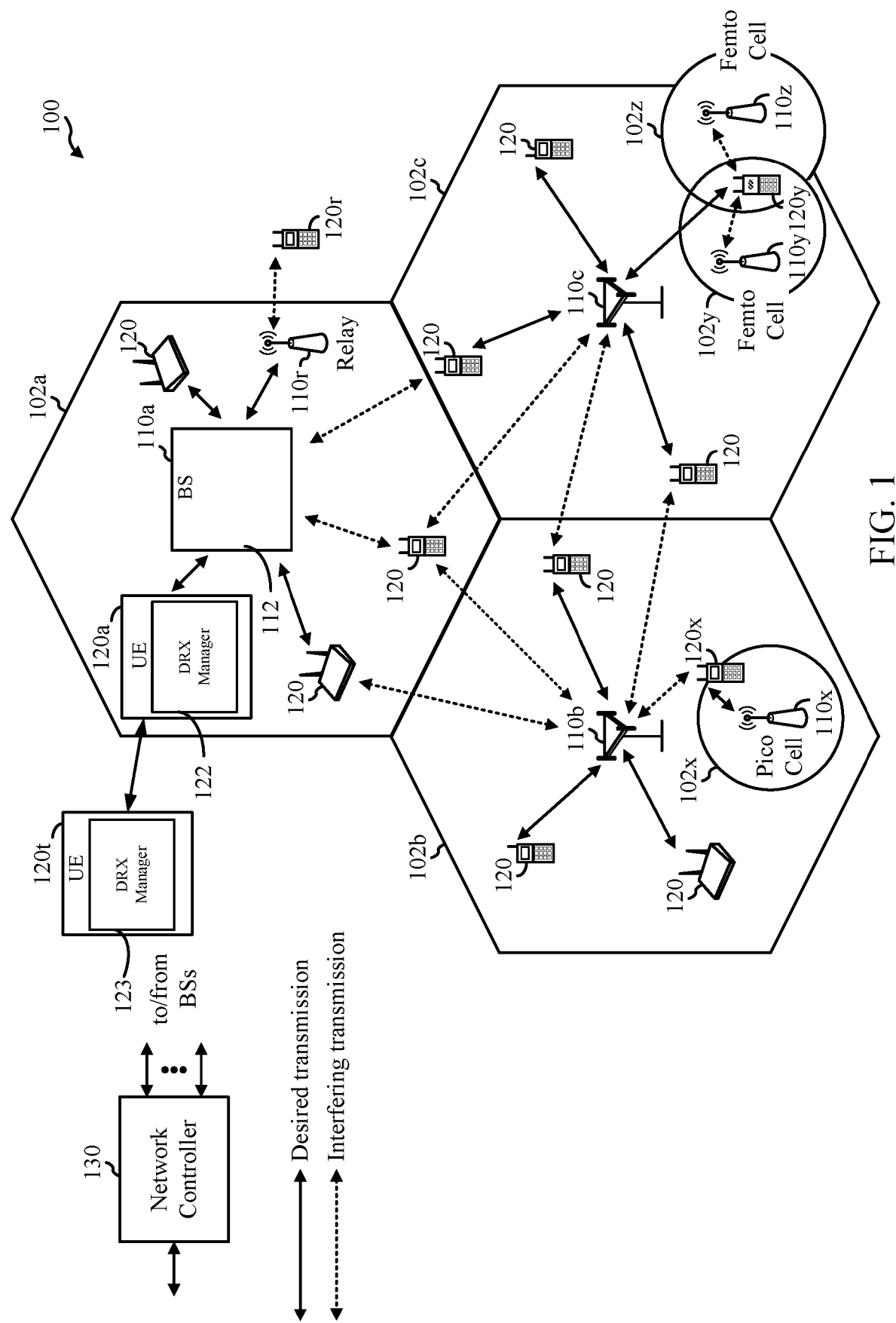
FIG. 1 is a block diagram conceptually illustrating an example telecommunications system, in accordance with certain aspects of the present disclosure.

Aspects of the present disclosure provide apparatus, methods, processing systems, and computer-readable mediums for sidelink discontinuous reception (SL DRX). For example, certain aspects provide techniques for configuring wake up indications for transmission and reception in SL DRX. In some aspects, a transmit (Tx) user equipment (UE) may indicate to a receive (Rx) UE whether to wake up during a configured SL DRX on phase by transmitting a wake up indication. By indicating to the Rx UE whether to wake up, power consumption may be reduced since the Rx UE may only wake up during a specific SL DRX on phase for which a wake up indication is received. Multiple Tx UEs may send wake up indications to one or more Rx UE(s) of a particular service, group, and/or UE pair.

Further, certain aspects provide, for connectionless grouping, how an Rx UE may determine to ignore a received wake up indication by including location information associated with the Tx UE in the wake up indication. The location information may be used by the Rx UE to decide whether to ignore the wake up indication based on whether the Tx UE is within communication range.

Certain aspects also provide techniques for power saving by monitoring the wake up indication within a sidelink bandwidth part (BWP). The sidelink BWP for wake up indication may be a BWP that is common or on an anchor carrier among UEs for the communication of wake up indications. The sidelink BWP for wake up indication may be configured with a narrow bandwidth such that the Rx UE does not have to monitor a BWP with a large bandwidth, reducing power consumption at the Rx UE.

The following description provides examples of configurations for sidelink (SL) communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for managing sidelink in a discontinuous reception (DRX) mode of operations. As shown in FIG. 1, the UE 120a includes a DRX manager 122. In some cases, the UE 120a may be receiving (Rx) UE. In this case, the DRX manager 122 may be configured to determine one or more sidelink DRX configurations associated with a communication on sidelink; monitor for at least one wake up indication from at least one other UE, the at least one wake up indication indicating a sidelink DRX on phase associated with the sidelink DRX configuration; decide an action for the sidelink DRX on phase based on the at least one wake up indication for the communication on sidelink; and perform one or more actions in accordance with the decision. The UE 120*t* may include a DRX manager 123. The UE 120*t* may be a transmitting (Tx) UE. In this case, the DRX manager 123 may be configured to determine one or more sidelink DRX configurations associated with a communication on sidelink; decide an action for a sidelink DRX on phase associated with the one or more sidelink DRX configurations; and transmit, to at least one other UE, at least one wake up indication indicating the action for the sidelink DRX on phase.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
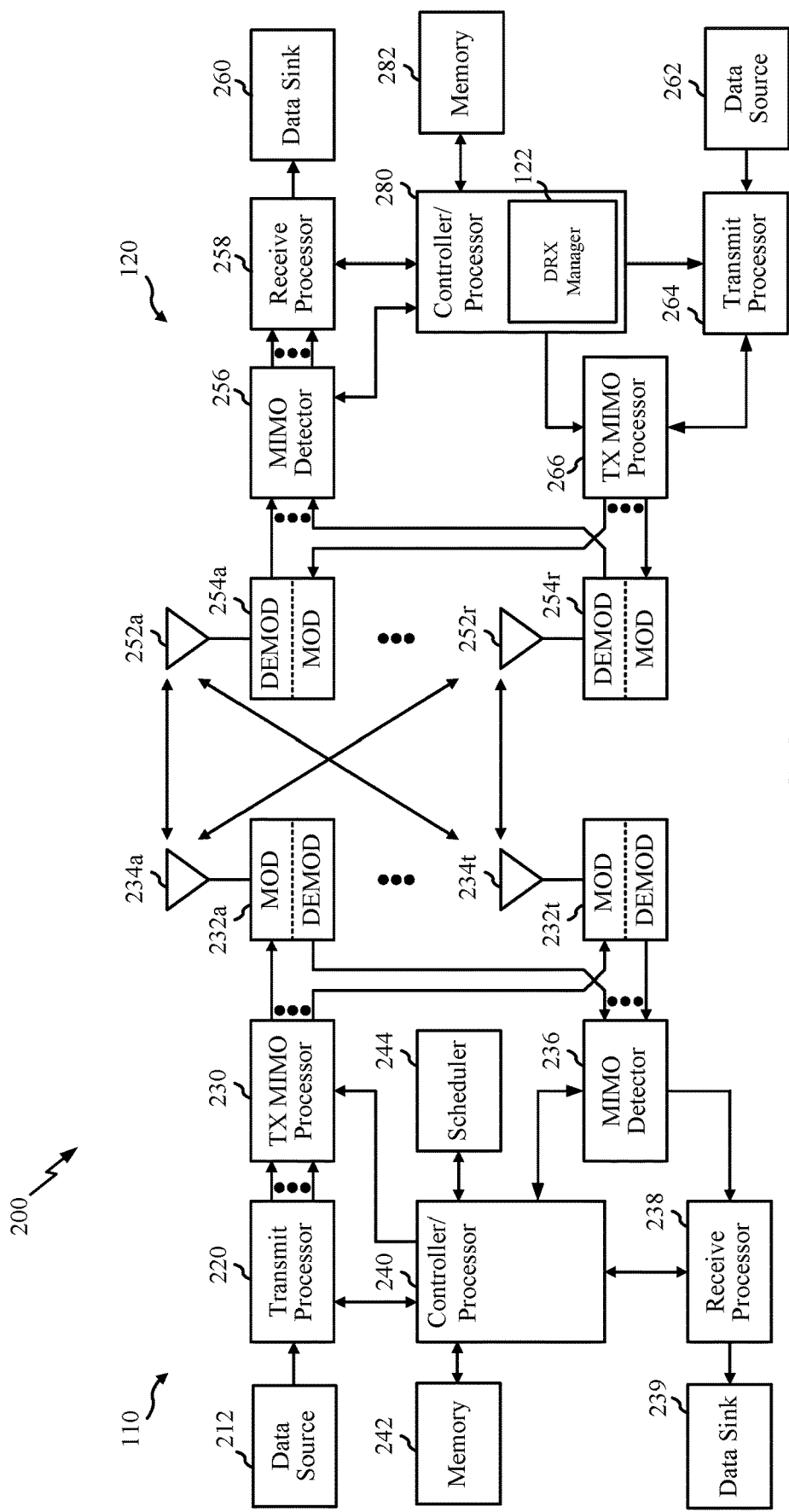
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information (CSI) reference signal (RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDMA or cyclic prefix (CP) orthogonal frequency division multiplexing (CP-OFDM), etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. As shown in FIG. 2, the controller/processor 280 of the UE 120*a* has the DRX manager 122. Although shown at the Controller/Processor, other components of the UE 120*a* may be used performing the operations described herein.

Figure 3B:
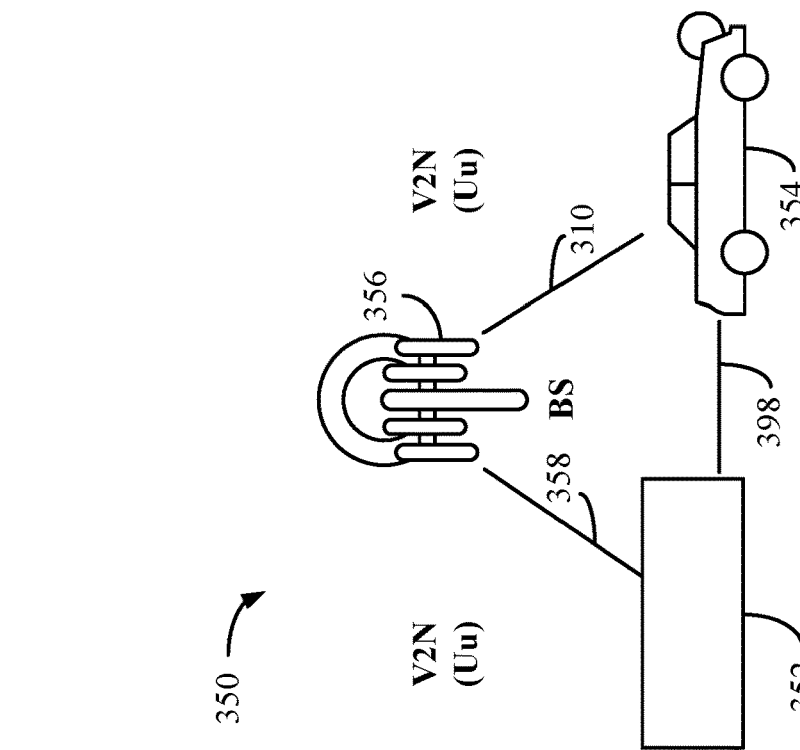
FIGS. 3A and 3B show diagrammatic representations of example vehicle to everything (V2X) systems in accordance with some aspects of the present disclosure.
Figure 3A:
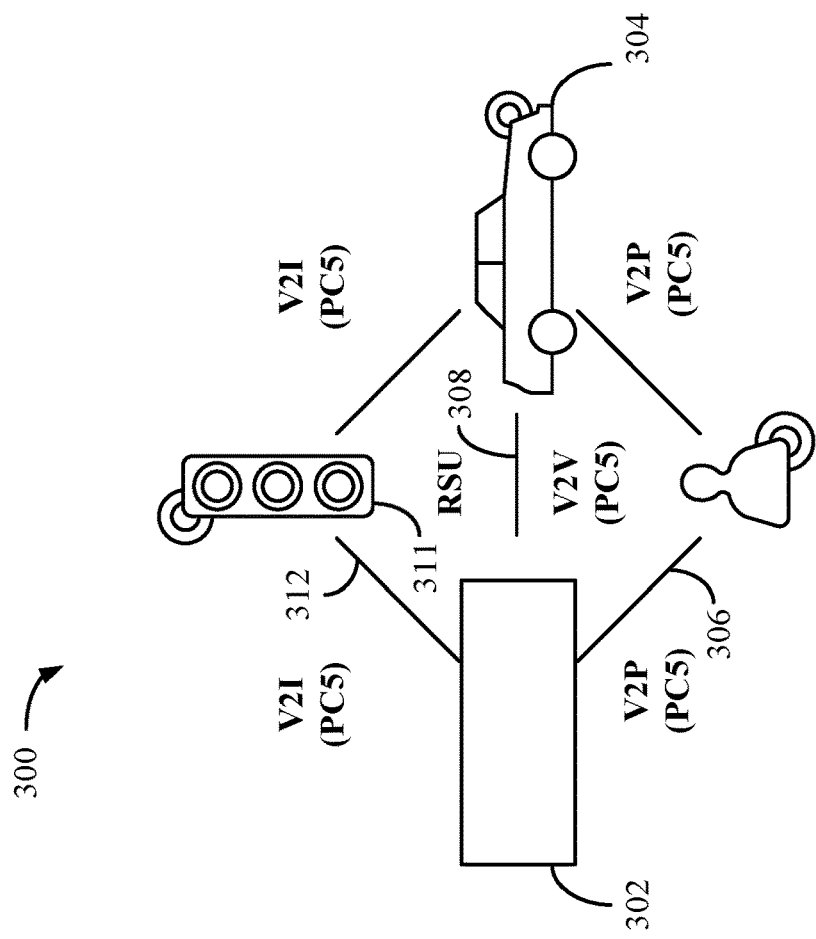

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE). As illustrated, UEs 352, 354 may communicate with each other using a sidelink (SL) 398 over a PC5 interface.

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, roadside unit (RSU) 311), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink control channel (PSCCH), a physical sidelink shared channel (PSSCH), and a physical sidelink feedback channel (PSFCH). The PSSCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as hybrid automatic repeat request (HARD) positive acknowledgment (ACK)/negative acknowledgment (NACK). PSSCH may be used to carry channel state information (CSI) related to a sidelink channel quality.

Discontinuous Reception (DRX) on Sidelink

In a discontinuous reception (DRX) mode of operation, a UE may go into a low power ("sleep") mode (also referred to herein as a "sleep phase"), which may also be referred to as a low power state, for a certain period of time (referred to as a DRX OFF phase, or duration) and wakes up again during a DRX on (e.g., awake phase) duration (also referred to as a DRX on phase) to check if there is any data to be received. The cycle of sleep and wake up (DRX on and DRX off) durations repeats over time, allowing the UE to save power while maintaining communication.

Currently, DRX is not defined for sidelink operations, and thus, a receiver (Rx) UE has to monitor for sidelink control information (SCI) for each time slot, causing high power consumption which is especially detrimental for battery power confined UEs such as pedestrian UEs for Vehicle-to-Person (V2P) service on sidelink or UEs for public safety services on sidelink. Thus, certain aspects provide a SL DRX design to save power for sidelink communications. As compared with communications between a UE and a base station (BS) on the Uu interface, sidelink communications among different UEs are more diverse. For example, a UE may simultaneously engage in different vehicle-to-everything (V2X) services with different quality of service (QoS) specifications (e.g., reliability, latency, etc.), and different communication types (e.g., broadcast, groupcast and unicast). Therefore, a one-size-fits-all SL DRX design may not be best for both saving power and meeting diverse QoS specifications.

Figure 4:
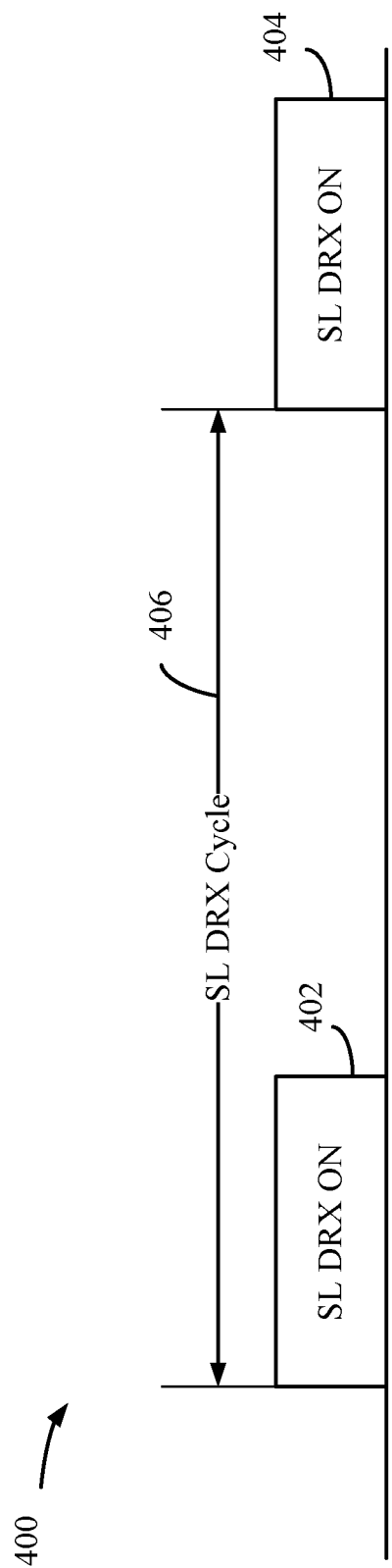
FIG. 4 illustrates an example sidelink discontinuous reception (SL DRX) configuration of a UE, in some aspects.

FIG. 4 illustrates an example SL DRX configuration 400 of a UE. As illustrated, the SL DRX configuration 400 may include SL DRX on phases 402, 404. As described herein, an SL DRX on phase repeats every DRX cycle. For example, the DRX on phase 402 is during a DRX cycle 406, as illustrated. A transmitter (Tx) UE is awake during the DRX on phases 402, 404 to communicate with another Rx UE for unicast or Rx UEs for broadcast and groupcast, (e.g., Rx UE(s) monitors for signaling that may be received from the Tx UE), and both Tx UE and Rx UE(s) are in a low power state (e.g., sleep phase) at other times (also referred to as SL DRX sleep phase). In addition, a UE of a service, a group, or a UE pair, becomes a Tx UE on sidelink when it has a packet to transmit on sidelink to the other UEs of a service or a group or to the other UE of a UE pair. Hence, differently from the DRX for a UE monitoring downlink control information (DCI) from a base station at the Uu interface, SL DRX is bidirectional on sidelink for both Tx UE and Rx UE(s) and therefore an SL DRX forms sidelink traffic patterns for a service, a group or a UE pair.

Certain aspects provide an SL DRX design to facilitate power saving for UEs in sidelink communications. For instance, as described in more detail herein, multiple Tx UEs may send wake up indications to one or more Rx UE(s) of a particular service, a UE group, and/or a UE pair corresponding to a SL DRX on phase. Further, certain aspects provide for connectionless grouping, and address how an Rx UE may determine to ignore a received wake up indication, allowing further power savings for the Rx UE. Certain aspects also provide techniques for power saving by monitoring the wake up indication within a sidelink bandwidth part (BWP).

Example Wake Up Indication Monitoring in SL DRX

As described herein, a sidelink discontinuous reception (SL DRX) may be formed to assist an Rx UE for at least one of unicast, broadcast or groupcast in determining when to monitor for sidelink control information(s) (SCI(s)) from a Tx UE, the SCI scheduling a sidelink transmission to the Rx UE(s). Thus, SL DRX allows the Rx UE(s) to save power by non-contiguously monitoring SCI. As described herein, an SL DRX is bidirectional and also forms the traffic pattern for a Tx UE. In other words, a Tx UE may not transmit while Rx UE(s) is not in an SL DRX on state for monitoring SCI(s). In other words, if the Rx UE(s) is not in a DRX on phase, the Rx UE may be in a sleep mode of operation and may not monitor for SCIs. Thus, a Tx UE may also forgo transmissions to other UEs that are not in a DRX on phase.

If different SL DRXs are formed for different communications types or different combinations of communications types, a UE participating in different sidelink communication types may wake up to monitor SCI for each sidelink DRX on phase regardless of whether there is any packet scheduled for transmission on sidelink. These communication types may include a communication among all UEs with an application or service using broadcast, a communication among UEs within a group using groupcast, and/or a communication between a UE pair using unicast. Waking up to monitor for SCI for each sidelink DRX on phase regardless of whether there is any packet scheduled causes unnecessary power consumption when there is no traffic within a sidelink DRX on phase. In certain aspects of the present disclosure, a Tx UE may signal or indicate to an Rx UE for unicast (or Rx UEs for broadcast and/or groupcast) to wake up (or to not wake up) to monitor for scheduling SCI(s) within an oncoming sidelink DRX on phase, reducing power consumption at the Rx UE.

Figure 5:
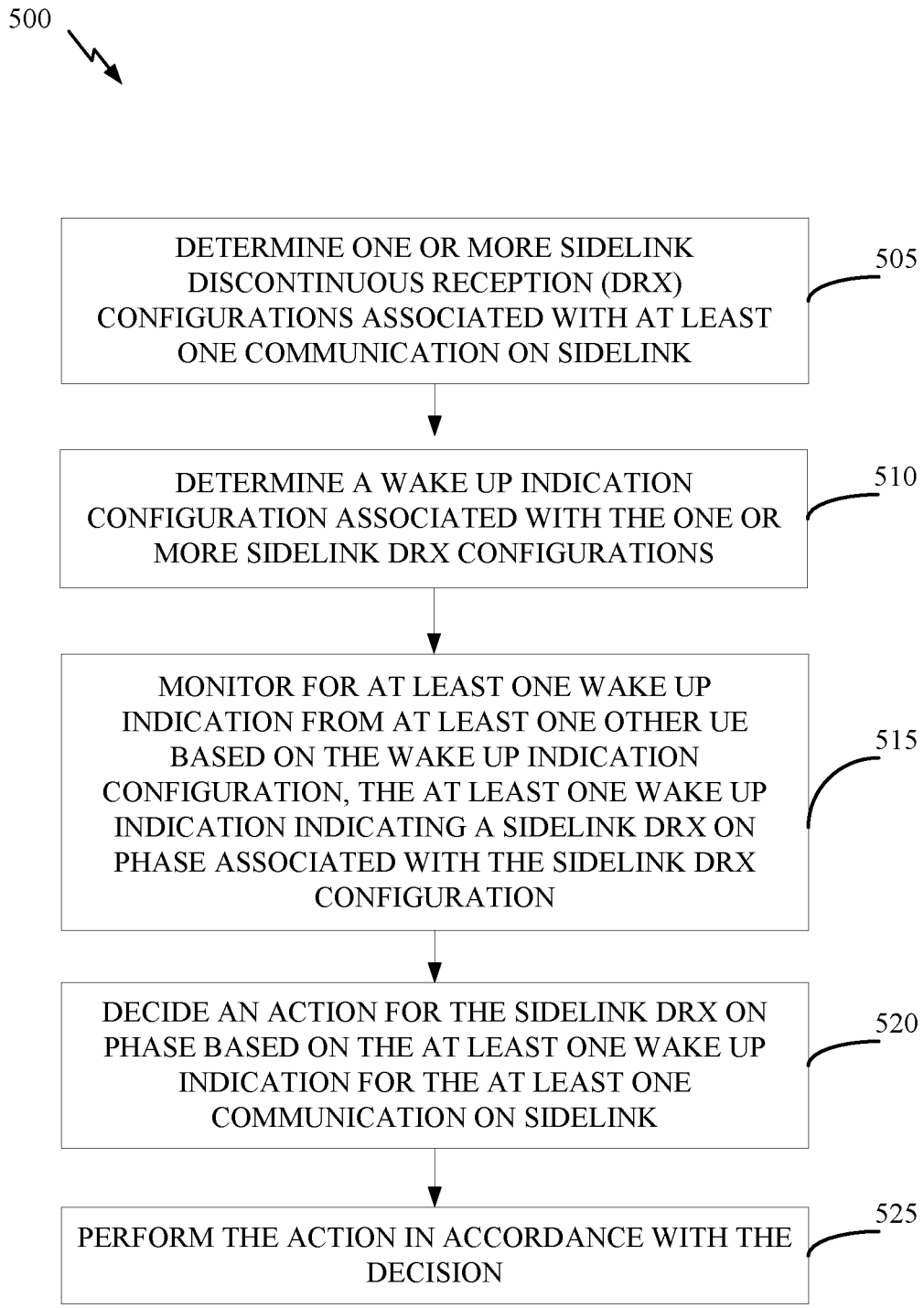
FIG. 5 is a flow diagram illustrating example operations for wireless communication by a receive (Rx) UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 120*a* in the wireless communication network 100, or a UE 120*t* out of the wireless communication network 100), such as an Rx UE. An Rx UE generally refers to a UE receiving signaling during a DRX on phase (e.g., from a Tx UE).

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with an Rx UE determining one or more sidelink DRX configurations associated with at least one communication on sidelink (e.g., at least one of broadcast, groupcast, or unicast). For example, the Rx UE may communicate with other UEs within a UE group via either groupcast or unicast and may also communicate to other UEs in a proximity via broadcast. Therefore, an SL DRX may be formed for UEs of the UE group for communications, or different SL DRXs may be formed for different communications or different combinations of communications among the UEs respectively.

At block 510, the Rx UE determines a wake up indication configuration associated with the one or more sidelink DRX configurations. At block 515, the Rx UE monitors for at least one wake up indication from at least one other UE based on the wake up indication configuration, the at least one wake up indication indicating a sidelink DRX on phase associated with the sidelink DRX configuration. The at least one wake up indication may include multiple wake up indications from different UEs transmitted using the same resource allocation, or different resource allocations.

At block 520, the Rx UE decides an action (e.g., whether to wake up) for the sidelink DRX on phase based on the at least one wake up indication for the at least one communication on sidelink. For instance, deciding the action for the sidelink DRX on phase may include deciding whether the Rx UE is to wake up during the sidelink DRX on phase associated with one of the one or more sidelink DRX configurations. The Rx UE may decide, based on a power saving specification, to skip the DRX on phase for saving power if no wake up indication is detected, in some scenarios. The UE may also decide, based on a power saving specification and/or quality of service (QoS) specification, not to skip the DRX on phase for reliability if no wake up indication is detected, in other scenarios.

At block 525, the Rx UE performs the action in accordance with the decision. In some aspects, each of the multiple wake up indications may indicate one or more parameters for receiving sidelink control signaling during the DRX on phase. For example, in addition to indicating that the Rx UE is to wake up during the DRX on phase, the at least one wake up indication may provide additional parameters facilitate receiving of sidelink control signaling, such as a configuration of the SL DRX (e.g., for one of the one or more sidelink DRX configurations), or an interval within the DRX on phase during which a sidelink signaling may be received (e.g., for one of the at least one communication or from one of the at least one other UE).

Figure 6:
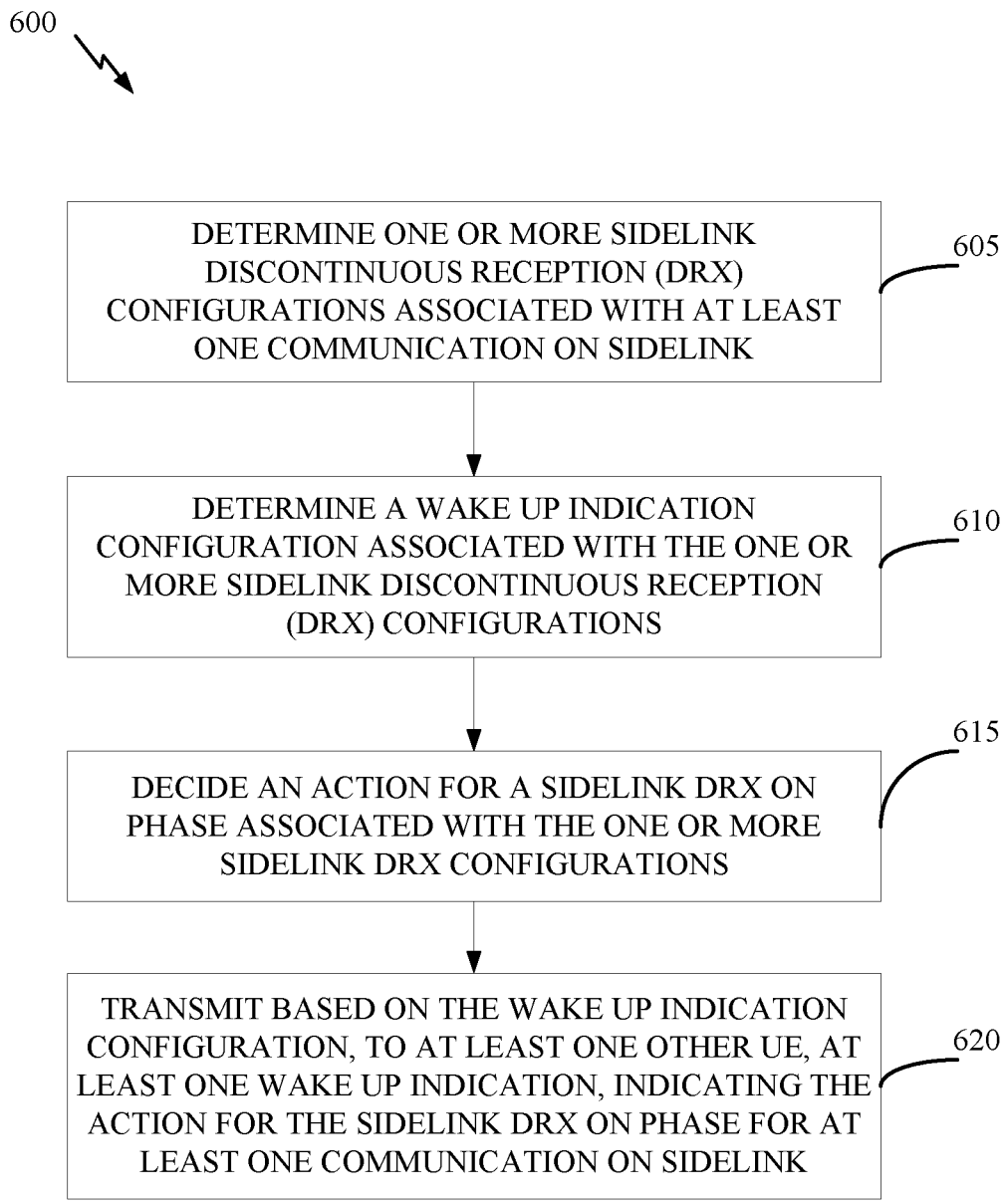
FIG. 6 is a flow diagram illustrating example operations for wireless communication by a transmit (Tx) UE, in accordance with certain aspects of the present disclosure.

FIG. 6 is a flow diagram illustrating example operations 600 for wireless communication, in accordance with certain aspects of the present disclosure. The operations 600 may be understood to be complementary to the operations 500 of FIG. 5. The operations 600 may be performed, for example, by a UE (e.g., such as a UE 120*a* in the wireless communication network 100, or a UE 120*t* out of the wireless communication network 100), such as a Tx UE. A Tx UE generally refers to a UE transmitting signaling during a DRX on phase (e.g., to a Rx UE). The operations 600 performed by the Tx UE may be complementary to the operations 500 performed by the Rx UE.

Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, with a Tx UE determining one or more sidelink DRX configurations associated with a communication on sidelink. At block 610, the Tx UE determines a wake up indication configuration associated with the one or more sidelink DRX configurations. At block 615, the Tx UE decides an action for a sidelink DRX on phase associated with the one or more sidelink DRX configurations. At block 620, the Tx UE transmits, to at least one other UE, at least one wake up indication, based on the wake up indication configuration, indicating the action for the sidelink DRX on phase for at least one communication on sidelink.

Any UE with an application or service using broadcast, within a group using groupcast, or of a UE pair using unicast may transmit a packet to other UE(s) on sidelink. Therefore, one or more Tx UEs may send wake up indications for monitoring the scheduling SCI within a coming sidelink DRX on phase. In certain aspects, all Tx UEs may send the same wake up indication at the same resource allocation, and the wake up indication may be a sequence-based wake up signaling design. In other words, each wake up indication may be signaled via a sequence. Alternatively, the Tx UEs may send different wake up indications at the same or different resource allocations, with a sequence-based wake up signaling design. In certain aspects, the wake up indication may be an SCI-based design or media access control (MAC) control element (CE)-based design.

Figure 7A:
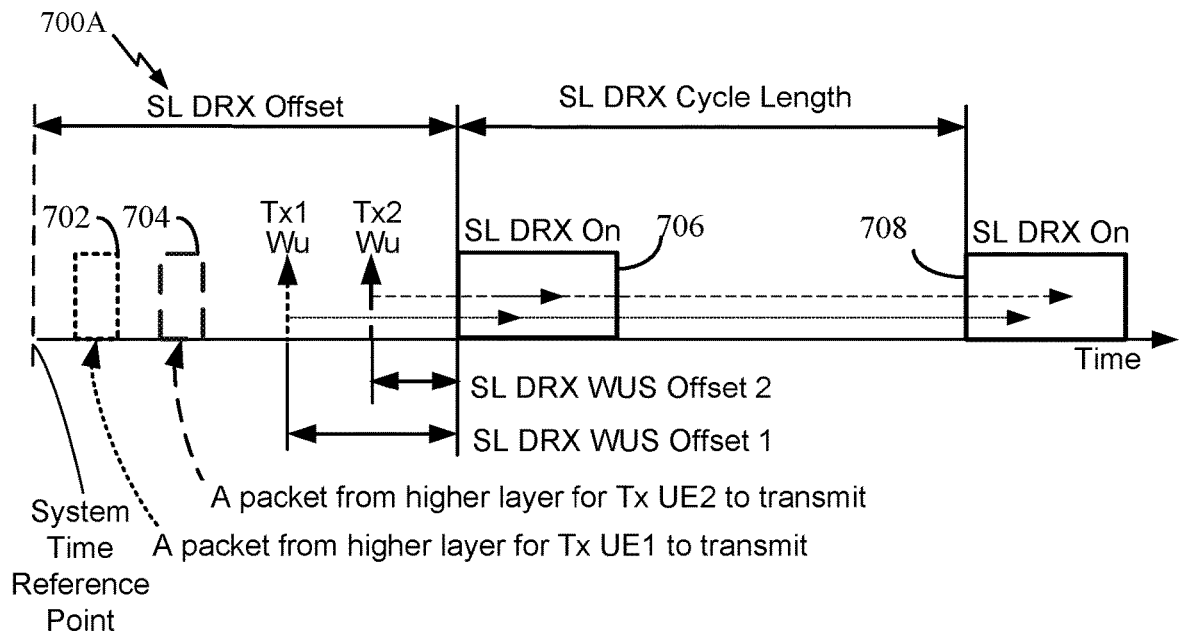
FIGS. 7A and 7B illustrate implementations of wake up indications from different Tx UEs, in accordance with certain aspects of the present disclosure.
Figure 7B:
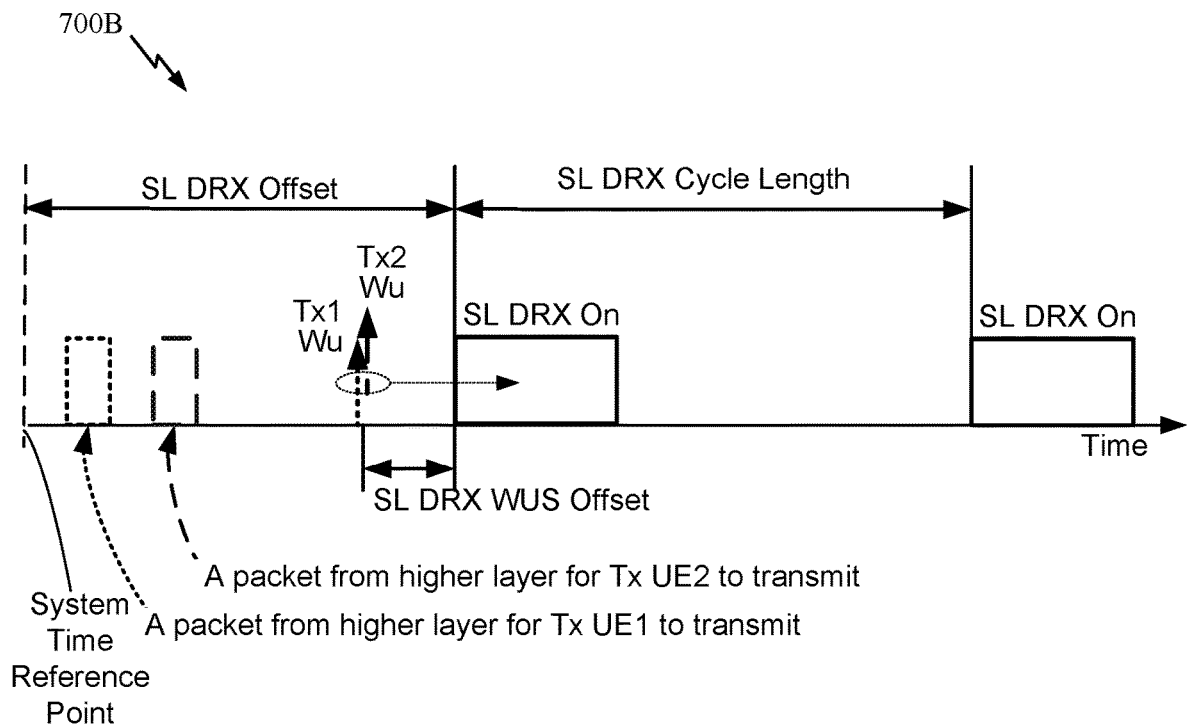

FIGS. 7A and 7B illustrate example implementations 700A, 700B of wake up indications from different transmitting (Tx) UEs, in accordance with certain aspects of the present disclosure. A UE with an application or service using broadcast, within a group using groupcast, or of a UE pair using unicast, becomes a Tx UE when the UE receives a packet from a higher layer for a transmission on sidelink. Further, any UE with an application or service using broadcast, within a group using groupcast, or of a UE pair using unicast, may transmit a packet to other UE(s) on sidelink. Therefore, one or multiple Tx UEs may send wake up indications for monitoring the scheduling SCI within one or multiple sidelink DRX on phases for a service, a UE group, or a UE pair, as illustrated. For example, a packet 702 received by a first Tx UE (Tx UE1) from a higher layer may trigger a transmission of a wake up indication (Tx1 Wu) by Tx UE1. In response, Tx UE1 may transmit Tx1 Wu indicating to the Rx UE to wake up during one or more of SL DRX on phases 706, 708 for communication. Similarly, a packet 704 received by a second Tx UE (Tx UE2) from a higher layer may trigger a transmission of a wake up indication (Tx2 Wu) by Tx UE2. In response, Tx UE2 may transmit Tx2 Wu indicating to the Rx UE to wake up during one or more of SL DRX on phases 706, 708 for communication. The wake up indications may be sent based on wake up indication configurations. As illustrated, as an example of wake up indication (e.g., wake up signaling (WUS) configurations, there may be an offset (SL DRX WUS Offset 1) between Tx1 Wu and the SL DRX on phase 706, and an offset (SL DRX WUS Offset 2) between Tx2 Wu and the SL DRX on phase 706. Moreover, the SL DRX on phase may begin after an offset (SL DRX Offset) from a system time reference point, as illustrated as an example of SL DRX configuration. In some cases, different active monitoring intervals for a Tx UE within the SL DRX on phase may be indicated, e.g., indicated by Tx1 WU for Tx UE1 and Tx2 WU for Tx UE2 in FIG. 7A.

In some cases, to save resources for wake up indications and time duration for Rx UE(s) to detect, Tx UEs may send the same wake up indication at the same resource allocation, which may be pre-configured and/or configured for a service, a UE group, or a UE pair. In this case, the Rx UE(s) may decide to wake up or not for monitoring the scheduling SCI within the coming SL DRX on phase based on the detected wake up indication from at least one Tx UE (e.g., to wake up or go to sleep for the coming one or multiple SL DRX On durations as indicated in the wake up indication). If no wake up indication is detected, an Rx UE may decide to wake up (or not wake up) based on pre-configuration or configuration. For instance, the Rx UE may determine to forgo waking up during a SL DRX on phase in order to save power based on a power saving configuration (e.g., based on UE capability or UE information), or determine to wake up during the SL DRX on phase to improve reliability based on power saving or QoS configuration (e.g., based on QoS profile for a service or service type). As shown in FIG. 7B, Tx UEs may send the same wake up signaling (WUS) at a physical resource location, which may be pre-configured or configured at a time indicated by sidelink DRX WUS offset (SL DRX WUS Offset) from the SL DRX on for a service, a UE group, or a UE pair. In other words, both Tx1 Wu and Tx2 Wu may be transmitted at the same time, and in some cases, using the same frequency resource, (e.g., using resources that are completely overlapped). In this case, the wake up indication from each Tx UE may be a sequence based WUS at a physical layer. For example, the Tx UE may include a sequence (e.g., a Zadoff-Chu (ZC) sequence or a pseudo-noise (PN) sequence such as maximum-length sequence (m-sequence) or Gold sequence). If the same sequence signaling is used from Tx UEs, the combined WUSs from different Tx UEs are detected by the RX UE(s), which indicates that at least one Tx UE will transmit in the coming SL DRX on phase, and the Rx UE(s) may continue monitoring SCI scheduling through the SL DRX on phase (e.g., the entire SL DRX on phase) without knowing how many Tx UEs are sending packets during the SL DRX on phase.

If different sequence signaling is used from each Tx UEs (e.g., different initial value or different cyclic shift associated to each Tx UE), the overlapped or multiplexed WUSs from different Tx UEs are detected by the RX UE(s), which indicates that a Tx UE sending WUS will transmit in the coming SL DRX on phase, and the Rx UE(s) may monitor SCI scheduling through the SL DRX on phase knowing how many Tx UEs are sending packets during the SL DRX on phase. In this case, the Rx UE(s) may stop monitoring SCI scheduling after successfully detecting all the Tx UEs' SCIs for more power saving.

In certain aspects, the Tx UEs may send different wake up indications (e.g., indicating wake-up or not from Tx UE(s)) at the same time and frequency resource allocation, e.g., via code division multiplexing (CDM) as shown in FIG. 7B, or different frequency resource allocations, e.g., via frequency division multiplexing (FDM) as shown in FIG. 7B, or different time resource allocation, e.g., via time division multiplexing (TDM) as shown in FIG. 7A, or any combination. The resource allocations may be pre-configured or configured for a service, a UE group, or a UE pair, as described. The Rx UE(s) may decide to wake up or not for monitoring the scheduling SCI from a Tx UE within a coming SL DRX on phase based on the detected wake up indication from the Tx UE (e.g., to wake up or go to sleep for the coming SL DRX On duration(s) as indicated in the wake up indication). In this case, the Rx UE(s) may stop monitoring SCI scheduling in the rest of SL DRX on phase after successfully detecting the scheduling SCIs from the Tx UEs sending wake up indications (e.g., indicating wake-up or wake-up for a time duration which may be used for setting the SL DRX On Duration timer). If no wake up indication is detected, an Rx UE may decide to wake up (or not wake up) based on certain configurations (e.g., for power saving or reliability). The RX UE may stay in an unawaken state without starting a SL DRX On Duration Timer (e.g., a timer indicating the duration of the SL DRX on phase) and skip monitoring the scheduling SCI in the coming SL DRX on phase. For reliability, the Rx UE may wake up, start the SL DRX On Duration Timer, and monitor the scheduling SCI in the coming SL DRX on phase.

Figure 8A:
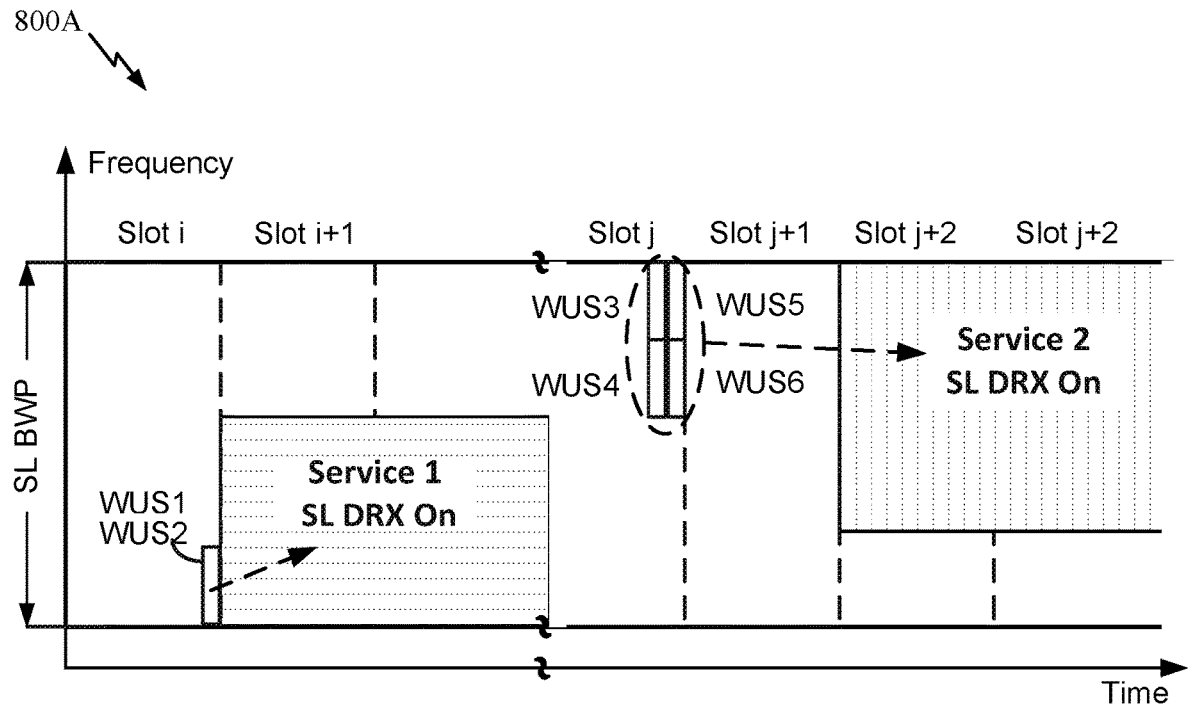
FIGS. 8A and 8B illustrate further implementations of wake up indications from different Tx UEs in SL DRX, in accordance with certain aspects of the present disclosure.
Figure 8B:
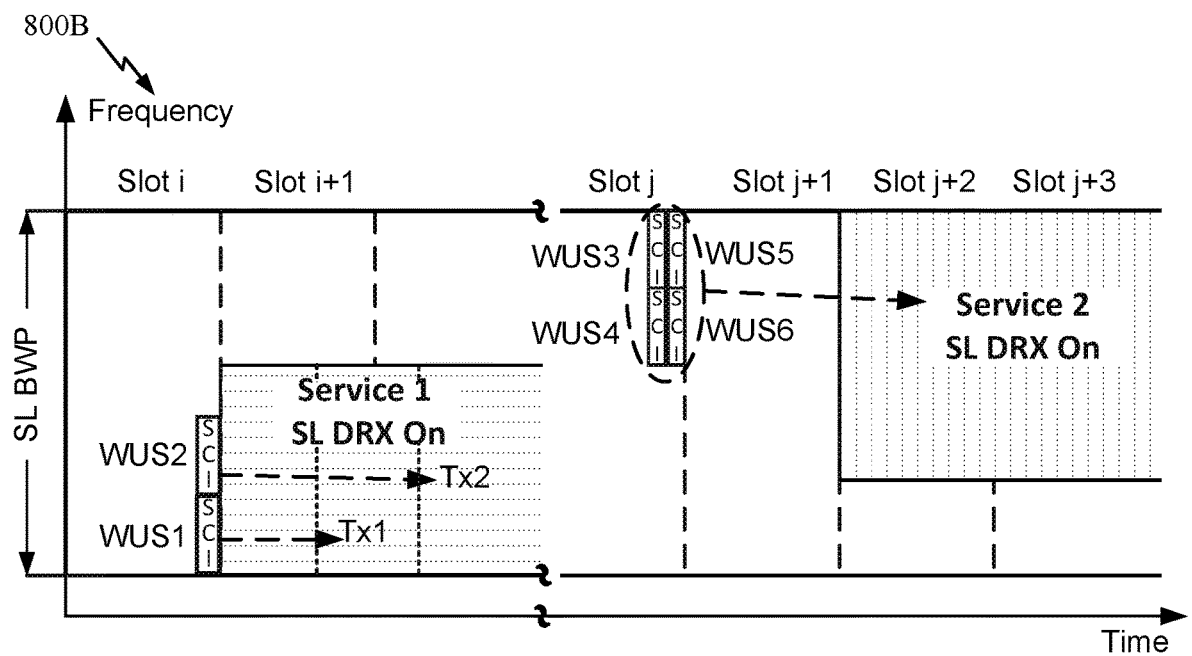

FIGS. 8A and 8B illustrate further implementations 800A, 800B of wake up indications (e.g., to wake up or not to wake up) from different Tx UEs for sidelink DRX, in accordance with certain aspects of the present disclosure. For Tx UEs sending different wake up indications at the same or different resources, the wake up indication may be designed as shown in FIGS. 8A and 8B. The wake up indication may be indicated via a sequence based (e.g., a ZC sequence or PN sequence) WUS at a physical layer (e.g., indicating wake up or no wake up), which may contain an identification of a Tx UE (e.g., the Tx UE's ID, source ID, etc.).

As shown in FIG. 8A, different WUSs (e.g., WUS1 and WUS2) may be sent via CDM. For example, the WUS1 and WU2 (e.g., from Tx UE1 and Tx UE2) may include different initial sequences or different cyclic shifts for different Tx UEs. The Rx UE(s) may then blindly detects each WUS with different initial sequences or cyclic shifts associated with the different Tx UEs.

As another example, different WUSs may be sent via FDM, TDM, or combined with both FDM and CDM, within the beginning or last few symbols of a slot or mini-slot prior to the SL DRX on phase and within the subchannels (as shown in FIG. 8A as an example) or out of the subchannels (e.g., one or multiple physical resource blocks (PRBs) or subchannels allocated for wake-up indication in frequency) used for a corresponding transmission(s) in a sidelink bandwidth part (SL BWP) for the coming SL DRX on phase. For instance, WUS3 and WUS4 may be transmitted using FDM (e.g., using different frequency resources), and WUS5 and WUS6 may be transmitted using FDM. WUS3 and WUS5 may be transmitted using TDM (e.g., using different time resources) and WUS4 and WUS6 may be transmitted using TDM, as illustrated. The Rx UE(s) may then detect each WUS at a different respective resource allocation. For example, the Rx UE may blindly detect each WUS with different sequences (e.g., initial values or cyclic shifts) at each respective resource allocation if combined with CDM. As used herein, blind detection generally refers to a UE detecting signaling from a Tx UE without knowing the exact allocation or structure or content for the signaling. As illustrated, the WUS1 and WUS2 from different Tx UEs may indicate that a transmission is to occur for service 1 during a sidelink DRX on phase, while WUS3, WUS4, WUS5, WUS6 from different Tx UEs may indicate that a transmission is to occur for service 2 during a sidelink DRX on phase.

As shown in FIG. 8B, each wake up indication may be a stand-alone SCI based WUS at a physical layer, e.g., sent within the beginning or last few symbols of a slot or mini-slot prior to the SL DRX on phase and within the subchannels (as shown in FIG. 8B as an example) or out of the subchannels (e.g., one or multiple PRBs or subchannels allocated for wake-up indication in frequency) used for a corresponding transmission(s) in a sidelink bandwidth part (SL BWP) for the coming SL DRX on phase, which may contain an identification of a Tx UE (e.g., Tx UE's ID, source ID, etc.). For example, the SCI may be a first stage SCI, or include combined first stage SCI and second stage SCI if two stage SCI is used. An SCI may be configured with two stages to reduce the size of the first stage SCI, improving communication efficiency.

Different WUSs may be sent via FDM (e.g., WUS1 and WUS2 in slot i) or TDM (e.g., WUS3 and WUS5, WUS4 and WUS6 in slot j) or both (e.g., WUS3, WUS4, WUS5 and WUS6 in slot j) for different Tx UEs such that Rx UE(s) can detect each WUS at a different respective resource allocation (e.g., for Tx1 or Tx2). In this case, more SL DRX information or power saving information may be indicated by different SCI fields (e.g., the active monitoring interval for a Tx UE within the SL DRX on phase, as indicated by WUS1 for Tx UE1 and WUS2 for Tx UE2 in FIG. 8B). In this case, the Rx UEs may decide an active monitoring interval from a Tx UE and skip the rest within the SL DRX on phase for more power saving. For example, all TX UEs may send the same public safety message in a proximity, via broadcast as an example, and Rx UE(s) may not need to monitor and receive all the public safety messages. For another example, some power-confined Rx UE(s) may only be interested in receiving a specific message(s), for example from a Tx UE within a range (if location is indicated in the wake up SCI) or from a Tx UE with a high priority (if priority is indicated in the wake up SCI), and may skip monitoring and receiving the other messages for power saving. In some cases, different services, groups or UE pairs may also be indicated in the WUS SCI for different communications (e.g., a service for broadcast, a group for groupcast, and a UE pair for unicast), so that the Rx UE(s) can decide to skip the monitoring in coming SL DRX on phase or not. The different services, groups or UE pairs may be indicated using a destination ID for a service using broadcast or for a group using groupcast, or a pair of source and destination ID or a link ID for paired UEs using unicast.

Figure 9:
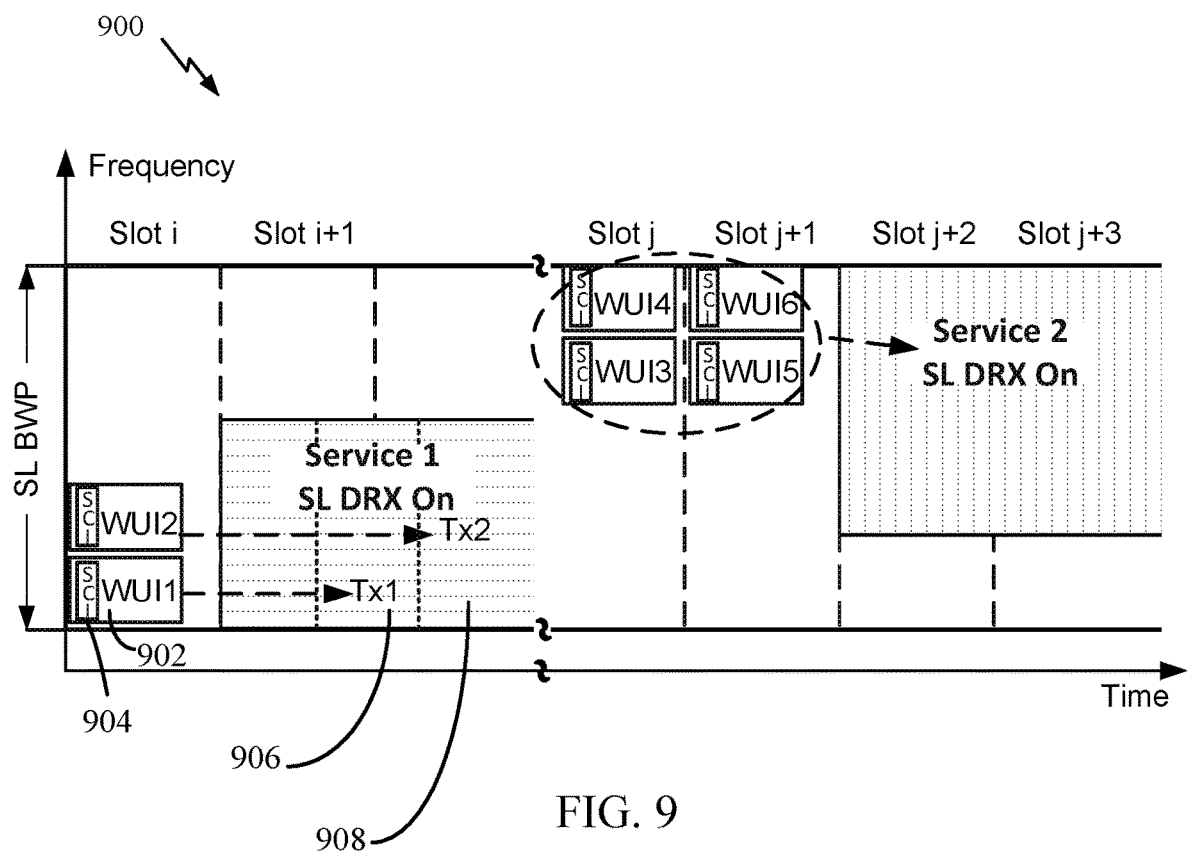
FIG. 9 illustrates yet another implementation of wake up indications from different Tx UEs in SL DRX, in accordance with certain aspects of the present disclosure.

FIG. 9 illustrates an example implementation 900 of wake up indications from different Tx UEs in sidelink DRX, in accordance with certain aspects of the present disclosure. In some cases, the wake up indication may be a MAC-CE-based wake up indication (WUI) at the MAC layer, e.g., sent within a slot or mini-slot prior to an SL DRX on phase and within subchannels (as shown in FIG. 9 as an example) or out of the subchannels (e.g., one or multiple PRBs or subchannels allocated for wake-up indication in frequency) used for a corresponding transmission(s) in a sidelink bandwidth part (SL BWP). The wake up indication may contain an identification of a Tx UE (e.g., Tx UE's ID, source ID, etc.), a destination identification for a service using broadcast or for a group using groupcast, or a pair of source and destination ID or a link ID for paired UEs using unicast. The wake up indication may also include location information, or priority information in a SCI (or in either a first or second stage of a second stage SCI if two stage SCI is used) associated with a physical SL shared channel (PSSCH) carrying the MAC-CE(s). For instance, the SCI 904 may be transmitted together with a PSSCH 902 for a first WUI (WUI1). Thus, different WUIs may be sent via FDM (e.g., WUI1 and WUI2 in slot i), TDM (e.g., WUI3 and WUI4 in slot j), or both (e.g., WUI3, WUI4, WUI5 and WUI6 in slots j and j+1) for different Tx UEs and/or different communications (e.g., a service for broadcast, a group for groupcast, and a UE pair for unicast) such that Rx UE(s) can detect each WUI at different respective resource allocations. In this case, more SL DRX information or power saving information may be indicated by different MAC-CEs, such as the active monitoring interval for a Tx UE with the SL DRX on phase (e.g., a value for SL DRX On Duration timer and/or or a value for SL DRX Inactivity timer and/or a value for SL DRX HARQ Retransmission timer). For instance, WUI1 may indicate an interval 906 of the SL DRX on phase for service 1 during which a transmission from Tx UE1 may be received, and WUI2 may indicate an interval 908 of the SL DRX on phase for service 1 during which a transmission from Tx UE2 may be received.

Figure 10:
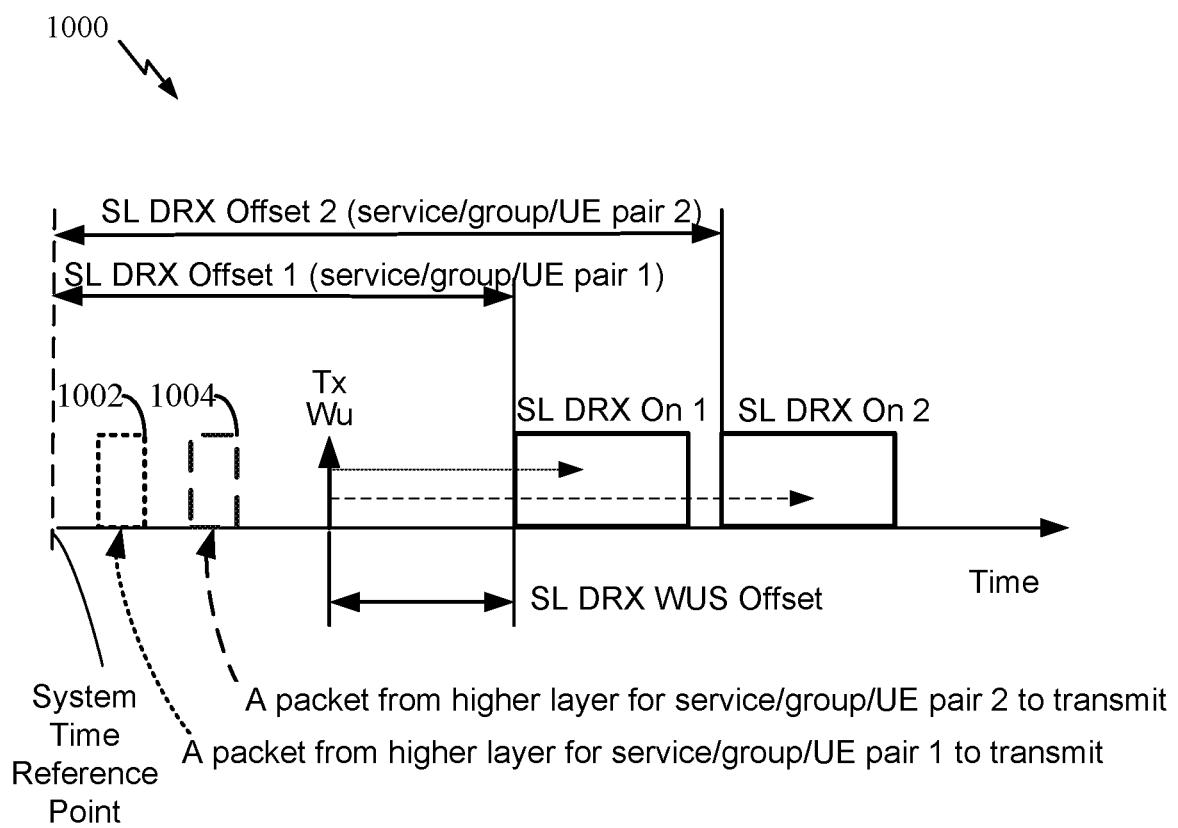
FIG. 10 illustrates an implementation of wake up indications for different SL DRX on phases, in accordance with certain aspects of the present disclosure.

FIG. 10 illustrates an implementation 1000 of wake up indications for different SL DRX on phases from a Tx UE, in accordance with certain aspects of the present disclosure. A UE may be a Tx UE for multiple services, UE groups, or UE pairs. In certain aspects, a Tx UE may send a wake up indication (Tx Wu) for more than one service, UE group, or UE pair, e.g., a Tx UE participating in more than one sidelink communications, or a special Tx UE such as a RSU, a group lead, a cluster head, a schedule UE or a relay UE for sending a wake up indication. The wake up indication may be a sequence and/or SCI based in the physical layer wake up signal or a MAC-CE-based wake up indication, as described herein. As described herein, in contrast with WUS from a BS to a UE on a Uu interface, a UE with an application or service using broadcast, within a group using groupcast, or of a UE pair using unicast, may become a Tx UE when the UE receives a packet from a higher layer for a transmission on sidelink. For example, a Tx UE may receive a packet 1002 corresponding to service 1, group 1, or UE pair 1 and a packet 1004 corresponding to service 2, UE group 2, or UE pair 2. Thus, the Tx UE may be a UE for multiple services, UE groups, or UE pairs. Therefore, to save a Tx UE's wake up indication overhead, the Tx UE may send one or more wake up indications for more than one service, UE group, or UE pair at a time allocation, as illustrated in FIG. 10. For instance, the Tx Wu may indicate a first sidelink DRX on phase (SL DRX on 1) for communication for service 1, group 1, UE pair 1, or any combination thereof. As illustrated, there may be a SL DRX offset 1 between the system time reference point and the beginning of SL DRX on 1. Similarly, the Tx Wu may indicate a second sidelink DRX on phase (SL DRX on 2) for communication for service 2, group 2, UE pair 2, or combination of any. As illustrated, there may be a SL DRX offset 2 between the system time reference point and the beginning of SL DRX on 2. SL DRX On 1 and SL DRX On 2 may at least partially overlap in time. In some cases, SL DRX On 1 and SL DRX On 2 may not overlap in time, as illustrated.

In some cases, the wake up indication may be a sequence (e.g., a ZC sequence or a PN sequence) indicated via WUS at the physical layer, which may contain an identification of a Tx UE (e.g., the Tx UE's ID, source ID, etc.). Further, different WUSs may be sent via CDM (e.g., different initial sequences or different cyclic shifts) for different services, UE groups, or UE pairs (e.g., using a destination ID for a service using broadcast or for a group using groupcast, or a pair of source and destination ID or link ID for paired UEs using unicast). The Rx UE(s) may then blindly detect each WUS with different initial sequences or cyclic shifts associated with different services, UE groups, or UE pairs. In certain aspects, different WUSs may be sent via FDM or TDM or combined with CDM, where different WUSs are mapped to different time and frequency resources for different services, UE, groups, or UE pairs. The Rx UE(s) may then detect each WUS at different respective frequency or time resource allocation. The Rx UE(s) may also blindly detect each WUS at different respective resource allocation if combined with CDM.

In some examples, the wake up indication may be a stand-alone SCI-based (e.g., a first stage SCI, or a combined first stage SCI and second stage SCI) WUS at the physical layer. The WUS may contain an identification of a Tx UE (e.g., Tx UE's ID, source ID, etc.) and/or one or more identifications for different services, UE groups, or UE pairs (e.g., a destination ID for a service or for a group ID, a UE pair or link ID for paired UEs, etc.). Further, the WUS may contain different fields in the SCI for different services, UE groups, or UE pairs, respectively. In this case, more SL DRX information or power saving information may be indicated by different SCI fields such as an active monitoring interval for a TX UE with the SL DRX On duration by setting timers such as a SL DRX On Duration timer, an Inactivity timer, and/or a HARQ Retransmission timer). The WUIs may include multiple stand-alone SCIs sent via FDM for different services, UE groups, or UE pairs, such that Rx UE(s) can detect each at different resource allocations. In certain aspects, SCI-based WUSs may be sent via FDM under one SL control resource set (CORESET) or different SL CORESETs at a same detection occasion in a sidelink search space.

The wake up indication may be a MAC-CE-based (e.g., carried on PSSCH) WUI in the MAC layer. In this case, the WUI may contain an identification of a Tx UE (e.g., a Tx UE's ID, source ID, etc.), one or more identifications for different services, UE groups, or UE pairs (e.g., a destination ID for a service or for a group, a pair of source and destination ID or a link ID for paired UEs, etc.), location information, priority information, etc. in SCI or in MAC-CEs. Further, the WUI may contain different fields with MAC-CE(s), or different MAC-CEs for different services, UE groups, or UE pairs, respectively. In this case, more sidelink DRX information or power saving information may be indicated by different fields or MAC-CEs such as the active monitoring interval for a TX UE with the SL DRX On duration. In certain aspects, the multiple MAC-CE WUIs may be sent via FDM for different services, UE groups, or UE pairs, such that Rx UE(s) can detect each at different respective resource allocation. Further, MAC-CE-based WUIs may be under different SL CORESETs at a same detection occasion in a sidelink search space if FDMed or at different detection occasions in different sidelink search spaces if TDMed.

Figure 11:
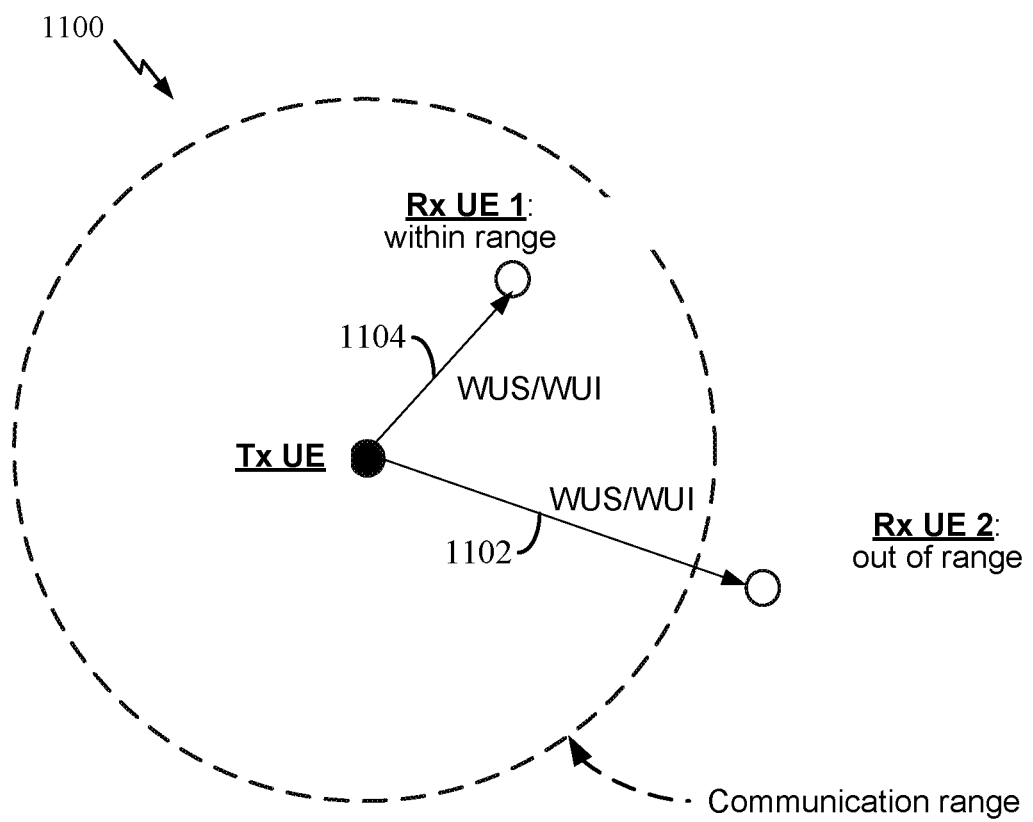
FIG. 11 illustrates an implementation for a distance-based wake up indication for SL DRX, in accordance with certain aspects of the present disclosure.

FIG. 11 illustrates an implementation 1100 for a distance-based wake up indication for SL DRX, in accordance with certain aspects of the present disclosure. In some implementations, UEs may communicate using a connectionless technique. In other words, the UEs may communicate without first performing a connection setup protocol. In certain aspects, grouping of UEs may be performed based on distance for connectionless type communication. For connectionless-based grouping (e.g., grouping based on distance), a Tx UE may send a wake up indication with location information, and an Rx UE may decide to ignore (or not ignore) the received wake up indication based on distance calculated with the location information. In other words, the Rx UE may decide whether the Tx UE and the Rx UE are within a communication range based on Tx UE and Rx UE's location information, as illustrated, and determine whether to ignore a wake up indication from the Tx UE accordingly. For instance, a distance-based wake up scheme may save an Rx UE's power by ignoring the wake up indication (e.g., not wake up for one or multiple SL DRX on durations) from a Tx UE if the Rx UE is out of the communication range from the Tx UE, as shown in FIG. 11. That is, Rx UE 1 may not ignore a wake up indication 1104 from the Tx UE since the Tx UE and the Rx UE 1 are within a specified or determined communication range. On the other hand, Rx UE 2 may ignore wake up indication 1102 since the Tx UE and the Rx UE 2 are not within the communication range. In some implementations, the wake up indications 1102, 1104 may indicate the communication range (e.g., the maximum communication distance between the Tx UE and the Rx UE) to be considered by the Rx UE.

In some cases, the Tx UE may send a wake up indication with location information via a stand-alone SCI-based WUS or a MAC-CE based WUI. As described above, the Rx UE may decide to ignore the received WUS (SCI-based) or WUI (MAC-CE-based) if the Rx UE determines it is outside of the communication range of the Tx UE. However, if the Rx UE is within the communication range, the Rx UE may wake up per the WUS or WUI for monitoring scheduling SCI in the coming SL DRX on phase. In certain aspects, the communication range may be preconfigured or configured with an SL DRX configuration and/or indicated in the WUS or WUI for a data packet to be transmitted, as described.

Figure 12A:
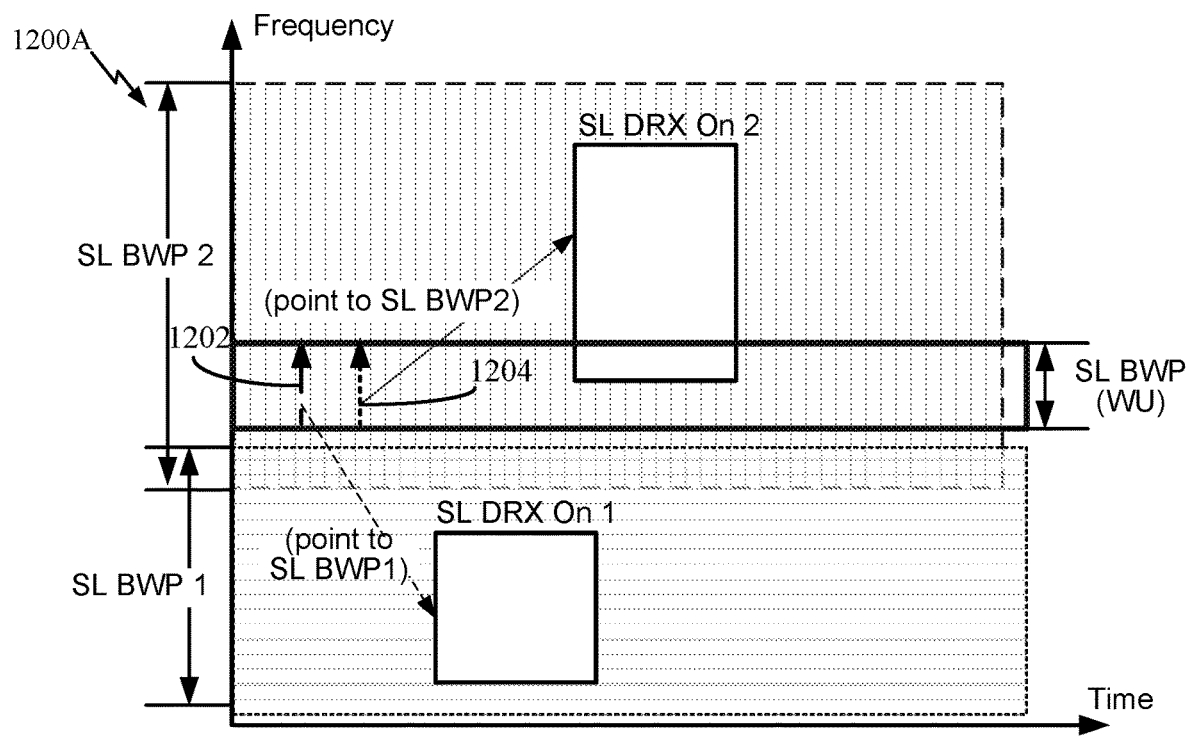
FIGS. 12A and 12B illustrate implementations for wake up indication for SL DRX based on a SL bandwidth part (BWP), in accordance with certain aspects of the present disclosure.
Figure 12B:
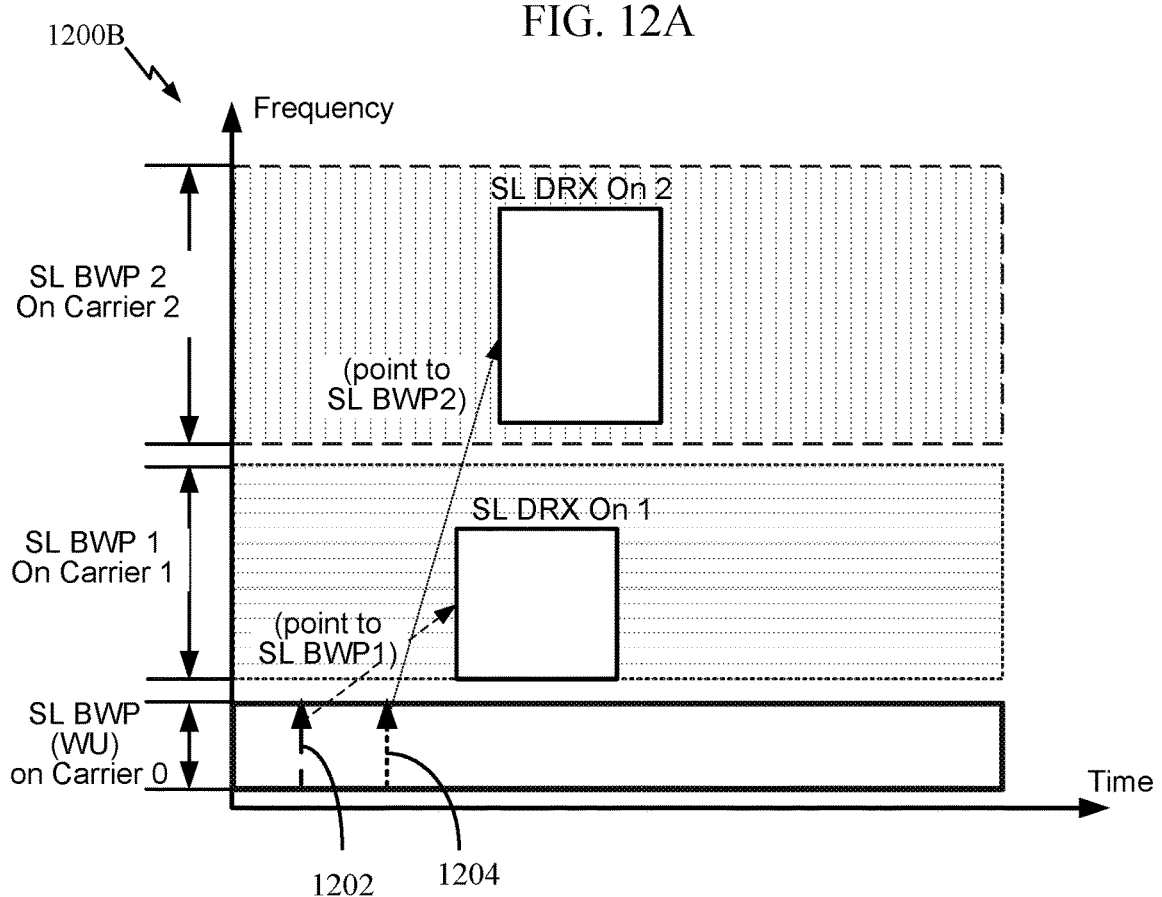

FIGS. 12A and 12B illustrate implementations 1200A, 1200B for wake up indication for SL DRX on a SL bandwidth part (BWP), in accordance with certain aspects of the present disclosure. For further power saving, a sidelink BWP may be implemented for monitoring wake up indication.

In some implementations, there may be only one SL BWP for all communications among UEs on SL, where the SL BWP is wide enough to support all SL traffic. Monitoring wake up indication (WUS or WUI) with this wide SL BWP consumes relatively high power for a UE, which is especially important for a battery power confined UE (e.g., a pedestrian UE). Therefore, certain aspects provide techniques for a SL BWP with a relatively smaller bandwidth for monitoring wake up indications on sidelink, as illustrated in FIGS. 12A and 12B. In some aspects, the SL BWP may be the BWP configured for multiple Tx UEs to transmit wakeup indications.

In certain aspects, if an Rx UE detects a wake up indication in a SL BWP, the Rx UE may switch to another SL BWP as indicated in the wake up indication. For example, as illustrated in FIG. 12A, the Rx UE may receive a wake up indication 1202 within the narrow SL BWP (WU) (e.g., a default SL BWP or a common SL BWP) and switch to wide SL BWP 1 for monitoring scheduling SCI within the coming SL DRX On 1 as indicated by the wake up indication 1202. The Rx UE may also receive a wake up indication 1204 within the narrow SL BWP (WU) (e.g., a default SL BWP or a common SL BWP) and switch to wide SL BWP 2 for monitoring scheduling SCI within the coming SL DRX On 2 as indicated by the wake up indication 1204. Alternatively, if no wake up indication is detected in SL BWP (WU), the Rx UE may stay at the SL BWP (WU) (e.g., a default SL BWP or a common SL BWP), e.g., forgo switching to monitor another wide BWP, and either continue monitoring for the wake up indication or enter a low power state (e.g., based on a configuration). In certain aspects, for a multi-carrier scenario, a wake up indication may be cell group specific. For example, as shown in FIG. 12B, the SL BWP (for WU signaling) (e.g., a default SL BWP or a common SL BWP) may be set at a primary carrier (e.g., primary cell (PCell)) or an anchor carrier configured or selected or activated for indicating wake up or not for SL DRX On durations on one or more carriers for multi-carrier operations (e.g., multi-connection or carrier aggregation).

As illustrated in FIG. 12A, the SL BWP (WU) (e.g., a default SL BWP or a common SL BWP) may partially (or fully) overlap with other SL BWP(s) (e.g., SL BWP2). In other aspects, the SL BWP (WU) may be non-overlapping with the other SL BWP(s) (e.g., SL BWP 1). In certain aspects, the SL BWP (WU) may be common for all Rx UEs to monitor wake up indications.

As illustrated in FIG. 12B, the SL BWP (for WU) may be on a first carrier (e.g., a primary carrier or an anchor shown as carrier 0), SL BWP 1 may be on a second carrier (e.g., carrier 1), and SL BWP 2 may be on a third carrier (e.g., carrier 2), where the first carrier, second carrier and third carrier are not the same. In certain aspects, the SL BWP (WU) may be on a primary carrier or anchor carrier for all Rx UEs to monitor wake up indications.

Figure 13:
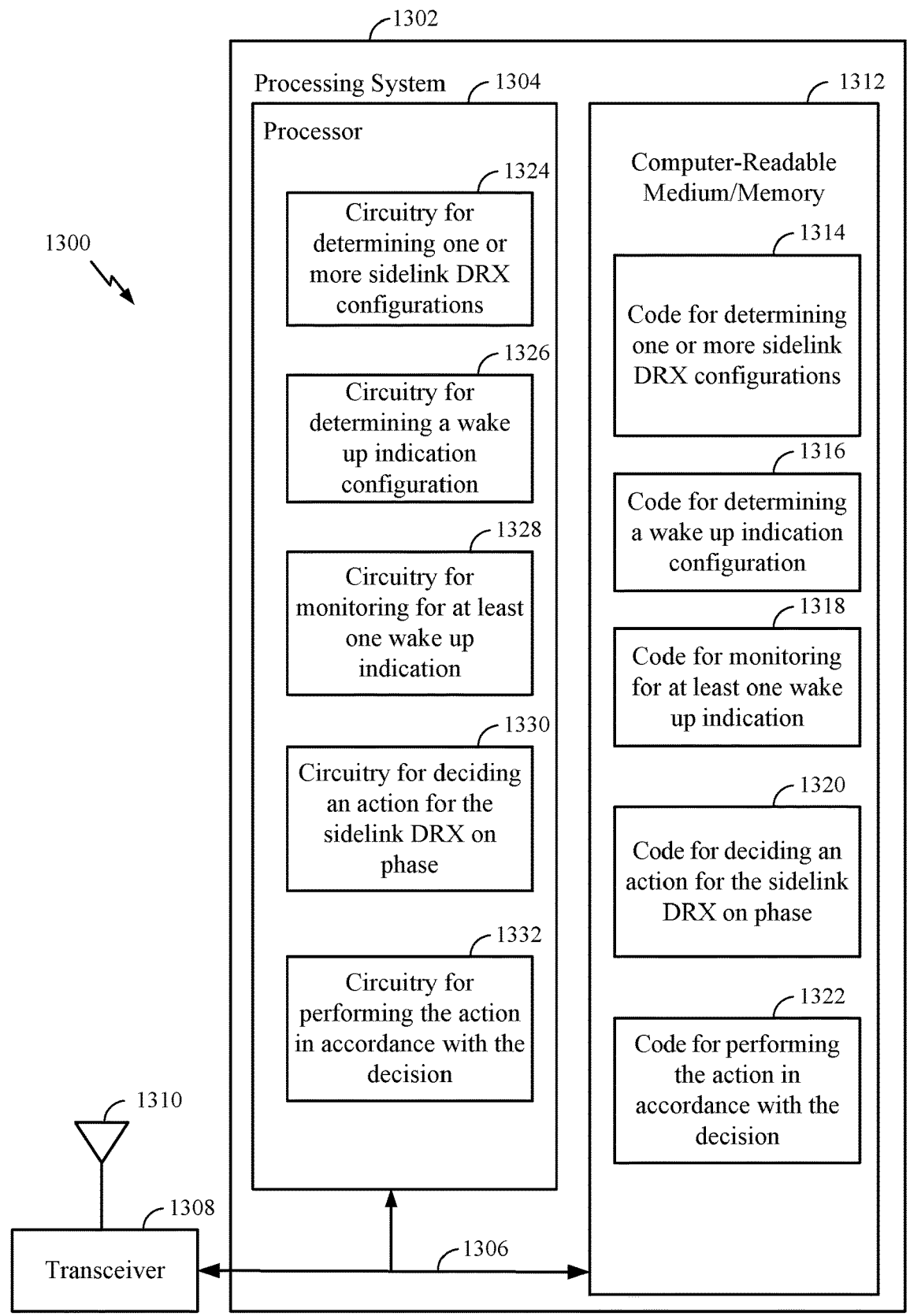
FIGS. 13 and 14 illustrate communications devices that may include various components configured to perform operations for the techniques disclosed herein.

FIG. 13 illustrates a communications device 1300 that may include various components (e.g., corresponding to means-plus-function components) configured to perform operations for the techniques disclosed herein, such as the operations illustrated in FIG. 5. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 5. In certain aspects, computer-readable medium/memory 1312 stores code 1314 for determining (e.g., determining one or more sidelink DRX configurations associated with at least a communication on sidelink); code 1316 for determining (e.g., determining a wake up indication configuration associated with the one or more sidelink DRX configurations); code 1318 for monitoring (e.g., monitoring for at least one wake up indication from at least one other UE based on the wake up indication configuration, the at least one wake up indication indicating a sidelink DRX on phase associated with the sidelink DRX configuration); code 1320 for deciding (e.g., deciding an action for the sidelink DRX on phase based on the at least one wake up indication for the at least one communication on sidelink); and code 1322 for performing (e.g., performing the action in accordance with the decision).

In certain aspects, the processor 1304 has circuitry configured to implement the code stored in the computer-readable medium/memory 1312. The processor 1304 includes circuitry 1324 for determining (e.g., determining one or more sidelink DRX configurations associated with at least a communication on sidelink); circuitry 1326 for determining (e.g., determining a wake up indication configuration associated with the one or more sidelink RX configurations); circuitry 1328 for monitoring (e.g., monitoring for at least one wake up indication from at least one other UE based on the wake up indication configuration, the at least one wake up indication indicating a sidelink DRX on phase associated with the sidelink DRX configuration); circuitry 1330 for deciding (e.g., deciding an action for the sidelink DRX on phase based on the at least one wake up indication for the at least one communication on sidelink); and circuitry 1332 for performing (e.g., performing the action in accordance with the decision).

Figure 14:
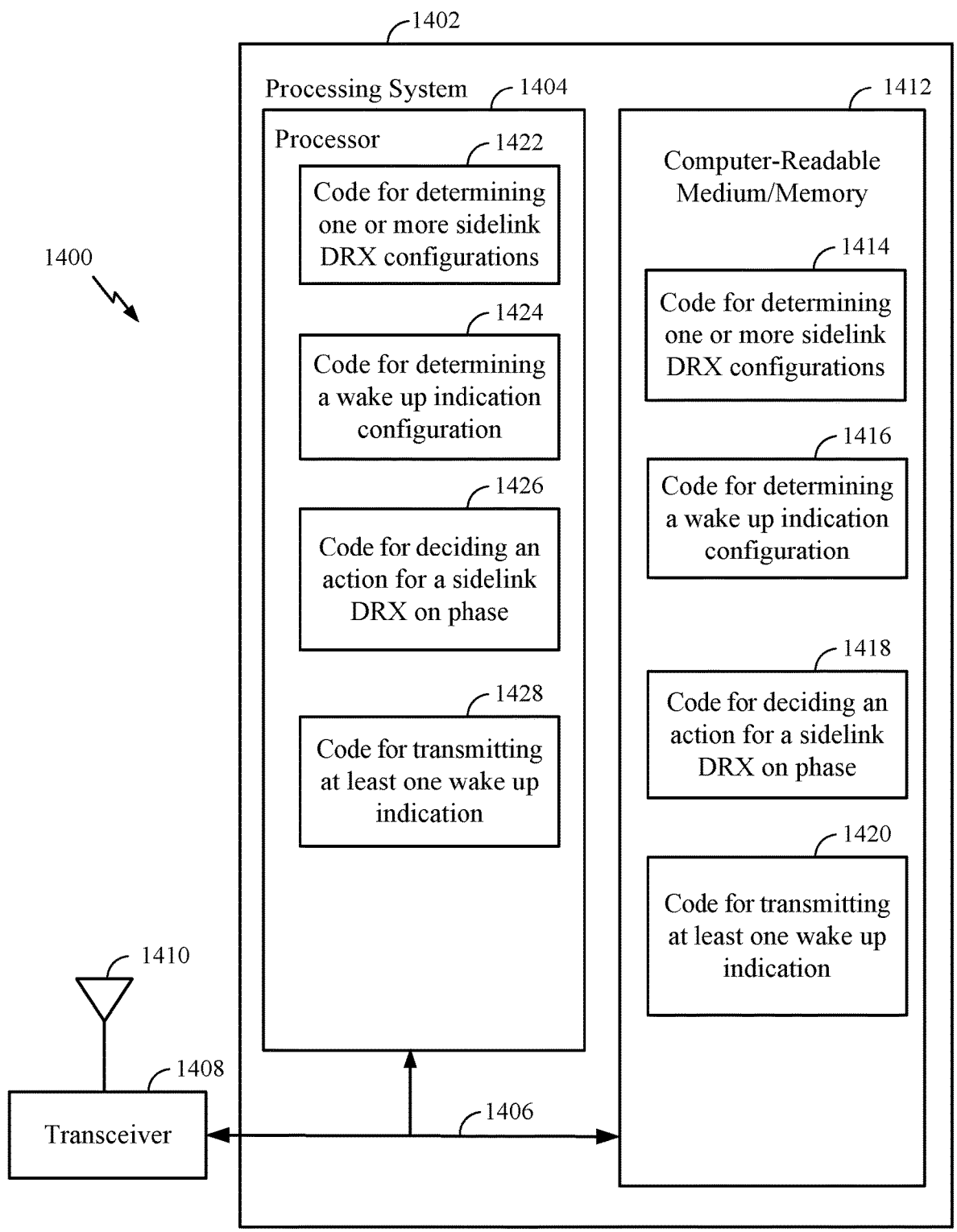

FIG. 14 illustrates a communications device 1400 that may include various components (e.g., corresponding to means-plus-function components) configured to perform operations for the techniques disclosed herein, such as the operations illustrated in FIG. 5. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 6. In certain aspects, computer-readable medium/memory 1412 stores code 1414 for determining (e.g., determining one or more sidelink DRX configurations associated with at least one communication on sidelink); code 1416 for determining (e.g., determining a wake up indication configuration associated with the one or more sidelink DRX configurations); code 1418 for deciding (e.g., deciding an action for a sidelink DRX on phase associated with the one or more sidelink DRX configurations); and code 1420 for transmitting (e.g., transmitting based on the wake up indication configuration, to at least one other UE, at least one wake up indication indicating the action for the sidelink DRX on phase for at least one communication on the sidelink). In certain aspects, the processor 1404 has circuitry configured to implement the code stored in the computer-readable medium/memory 1412. The processor 1404 includes circuitry 1422 for determining (e.g., determining one or more sidelink DRX configurations associated with at least one communication on sidelink); circuitry 1424 for determining (e.g., determining a wake up indication configuration associated with the one or more sidelink DRX configurations); circuitry 1426 for deciding (e.g., deciding an action for a sidelink DRX on phase associated with the one or more sidelink DRX configurations); and circuitry 1428 for transmitting (e.g., transmitting based on the wake up indication configuration, to at least one other UE, at least one wake up indication indicating the action for the sidelink DRX on phase for at least one communication on the sidelink).

Example Clauses

Clause 1. A method for wireless communication by a user equipment (UE), comprising: determining one or more sidelink discontinuous reception (DRX) configurations associated with at least one communication on sidelink; determining a wake up indication configuration associated with the one or more sidelink discontinuous reception (DRX) configurations; monitoring for at least one wake up indication from at least one other UE based on the wake up indication configuration, the at least one wake up indication indicating a sidelink DRX on phase associated with the sidelink DRX configuration; deciding an action for the sidelink DRX on phase based on the at least one wake up indication for the at least one communication on sidelink; and performing the action in accordance with the decision.

Clause 2. The method of clause 1, wherein the at least one wake up indication comprises a sequence or at least one of sidelink control information (SCI) or a media access control (MAC) control element (CE) indicating the action for the sidelink DRX on phase or the sidelink DRX on phase associated with one of the one or more sidelink DRX configurations.

Clause 3. The method of any one of clauses 1-2, wherein deciding the action for the sidelink DRX on phase comprises deciding whether the UE is to wake up to monitor for sidelink control information or to sleep during the sidelink DRX on phase associated with one of the one or more sidelink DRX configurations based on the at least one wake up indication.

Clause 4. The method of any one of clauses 1-3, wherein deciding the action for the sidelink DRX on phase comprises deciding, based on a power saving configuration or quality of service configuration, to skip or to enter the DRX on phase to monitor for sidelink control information if no wake up indication is received.

Clause 5. The method of any one of clauses 1-4, wherein the at least one wake up indication comprises multiple wake up indications from different UEs, the multiple wake up indications being transmitted using the same resource allocation.

Clause 6. The method of any one of clauses 1-5, wherein the at least one wake up indication comprises multiple wake up indications from different UEs, the multiple wake up indications being transmitted using different resource allocations.

Clause 7. The method of clause 6, wherein at least one of the multiple wake up indications indicates one or more parameters for receiving signaling during the DRX on phase.

Clause 8. The method of any one of clauses 6-7, wherein the multiple wake up indications are at least one of code division multiplexed, frequency division multiplexed, or time division multiplexed.

Clause 9. The method of any one of clauses 1-8, wherein the at least one wake up indication comprises an identifier of a respective one of the at least one other UE, and wherein performing the action comprises monitoring for signaling from the respective one of the at least one other UE based on the identifier.

Clause 10. The method of any one of clauses 1-9, wherein the at least one wake up indication indicates an active sidelink DRX on phase with respect to the at least one communication for a plurality of services, UE groups, or UE pairs.

Clause 11. The method of any one of clauses 1-10, wherein the at least one communication comprises communication for a plurality of services via broadcast, communication among each of a plurality of UE groups via groupcast, or communication between each of a plurality UE pairs via unicast in accordance with the at least one wake up indication.

Clause 12. The method of any one of clauses 1-11, wherein the at least one wake up indication indicates at least location information associated with a respective one of the at least one other UE.

Clause 13. The method of clause 12, wherein deciding the action comprises determining, based on the location information, to ignore the wake up indication if the respective one of the at least one other UE is outside a communication range.

Clause 14. The method of clause 13, wherein the wake up indication indicates the communication range for the respective one of the at least one other UE.

Clause 15. The method of any one of clauses 1-14, wherein: the monitoring for the at least one wake up indication comprises monitoring for the at least one wake up indication in a first sidelink bandwidth part (BWP), the at least one wake up indication indicating that the UE is to receive signaling during the sidelink DRX on phase in a second sidelink BWP; and performing the action comprises communicating in the second sidelink BWP in accordance with the at least one wake up indication.

Clause 16. The method of clause 15, wherein the first sidelink BWP is a default or common sidelink BWP.

Clause 17. A method for wireless communication by a user equipment (UE), comprising: determining one or more sidelink discontinuous reception (DRX) configurations associated with at least one communication on sidelink; determining a wake up indication configuration associated with the one or more sidelink DRX configurations; deciding an action for a sidelink DRX on phase associated with the one or more sidelink DRX configurations; and transmitting based on the wake up indication configuration, to at least one other UE, at least one wake up indication indicating the action for the sidelink DRX on phase for at least one communication on the sidelink.

Clause 18. The method of clause 17, wherein the at least one wake up indication comprises a sequence or at least one of sidelink control information (SCI) or a media access control (MAC) control element (CE) indicating the action for the sidelink DRX on phase or the sidelink DRX on phase associated with one of the one or more sidelink DRX configurations.

Clause 19. The method of any one of clauses 17-18, wherein deciding the action for the sidelink DRX on phase comprises deciding whether the UE is to wake up to monitor for sidelink control information or to sleep during the sidelink DRX on phase associated with one of the one or more sidelink DRX configurations.

Clause 20. The method of any one of clauses 17-19, further comprising transmitting SCI during the sidelink DRX on phase in accordance with the one or more sidelink DRX configurations or the at least one wake up indication.

Clause 21. The method of any one of clauses 17-20, wherein the at least one wake up indication indicates one or more parameters for receiving signaling during the DRX on phase.

Clause 22. The method of any one of clauses 17-21, wherein each of the at least one wake up indication comprises an identifier of the UE.

Clause 23. The method of any one of clauses 17-22, further comprising communicating for a plurality of services via broadcast, communicating among each of a plurality of UE groups via groupcast, or communicating between each of a plurality UE pairs via unicast in accordance with the at least one wake up indication.

Clause 24. The method of any one of clauses 17-23, wherein the at least one wake up indication indicates at least location information associated with the UE.

Clause 25. The method of clause 24, wherein the at least one wake up indication indicates a communication range between the UE and a respective one of the at least one other UE.

Clause 26. The method of any one of clauses 17-25, wherein: the at least one wake up indication is transmitted in a first sidelink bandwidth part (BWP), the at least one wake up indication indicating that the at least one other UE is to receive signaling during the sidelink DRX on phase in a second sidelink BWP; and the method further comprising communicating with the at least one other UE in the second sidelink BWP in accordance with the at least one wake up indication.

Clause 27. The method of clause 26, wherein the first sidelink BWP is a default or common sidelink BWP.

Clause 28. A method for wireless communication by a user equipment (UE), comprising: determining one or more sidelink discontinuous reception (DRX) configurations associated with at least a communication on sidelink; determining a wake up indication configuration associated with the one or more sidelink discontinuous reception (DRX) configurations; monitoring for at least one wake up indication from at least one other UE based on the wake up indication configuration, the at least one wake up indication indicating a sidelink DRX on phase associated with the sidelink DRX configuration; deciding an action for the sidelink DRX on phase based on the at least one wake up indication for the at least one communication on sidelink; and performing one or more actions in accordance with the decision.

Clause 29. The method of clause 28, wherein the at least one wake up indication comprises a sequence indicating the action for the sidelink DRX on phase.

Clause 30. The method of any one of clauses 28-29, wherein the at least one wake up indication is included in at least one of sidelink control information (SCI) or a media access control (MAC) control element (CE) indicating the action for the sidelink DRX on phase or the sidelink DRX on phase associated with one of the one or more sidelink DRX configurations.

Clause 31. The method of any one of clauses 28-30, wherein deciding the action for the sidelink DRX on phase comprises deciding whether the UE is to wake up during the sidelink DRX on phase associated with one of the one or more sidelink DRX configurations.

Clause 32. The method of any one of clauses 28-31, wherein deciding the action for the sidelink DRX on phase comprises deciding, based on a power saving configuration, to skip the DRX on phase if no wake up indication is received.

Clause 33. The method of any one of clauses 28-32, wherein deciding the action for the sidelink DRX on phase comprises deciding, based on a power saving or quality of service configuration, to enter the DRX on phase if no wake up indication is received.

Clause 34. The method of any one of clauses 28-33, wherein the one or more actions comprise waking up to monitor for sidelink control information during the sidelink DRX on phase in accordance with the DRX on phase configuration or the at least one wake up indication.

Clause 35. The method of any one of clauses 28-34, wherein the at least one wake up indication comprises multiple wake up indications from different UEs, the multiple wake up indications being transmitted using the same resource allocation.

Clause 36. The method of clause 35, wherein the multiple wake up indications comprise the same sequence indicating that the UE is to wake up for the at least one communication during the DRX on phase.

Clause 37. The method of any one of clauses 35-36, wherein the multiple wake up indications comprise different sequences indicating that the UE is to wake up for communication with respective one of the at least one other UE during the DRX on phase.

Clause 38. The method of any one of clauses 35-37, wherein the multiple wake up indications comprise different sequences indicating that the UE is to wake up for communication with respective one of the at least one communication.

Clause 39. The method of any one of clauses 28-38, wherein the at least one wake up indication comprises multiple wake up indications from different UEs, the multiple wake up indications being transmitted using different resource allocations.

Clause 40. The method of clause 39, wherein at least one of the multiple wake up indications indicates one or more parameters for receiving signaling during the DRX on phase.

Clause 41. The method of any one of clauses 39-40, wherein the multiple wake up indications being at least one of code division multiplexed, frequency division multiplexed, or time division multiplexed.

Clause 42. The method of any one of clauses 28-41, wherein the at least one wake up indication comprises an identifier of a respective one of the at least one other UE, and wherein performing the one or more actions comprises monitoring for signaling from the respective one of the at least one other UE based on the identifier.

Clause 43. The method of any one of clauses 28-42, wherein the at least one wake up indication indicates an active sidelink DRX on phase with respective to the at least one communication for a plurality of services, UE groups, or UE pairs.

Clause 44. The method of clause 43, wherein the at least one wake up indication indicates the active sidelink DRX on phase for a respective one of the plurality of services, UE groups, or UE pairs.

Clause 45. The method of clause 44, wherein the at least one wake up indication comprises a sequence associated with the respective one of the plurality of services, UE groups, or UE pairs.

Clause 46. The method of any one of clauses 44-45, wherein the at least one wake up indication is included in at least one sidelink control information (SCI) or a media access control (MAC) control element (CE).

Clause 47. The method of any one of clauses 43-46, wherein the one or more actions comprises communication for the plurality of services via broadcast, communication among each of the plurality of UE groups via groupcast, or communication between each of the plurality UE pairs via unicast in accordance with the at least one wake up indication.

Clause 48. The method of any one of clauses 28-47, wherein the at least one wake up indication indicates location information associated with a respective one of the at least one other UE.

Clause 49. The method of clause 48, wherein performing the one or more actions comprises determining, based on the location information, to ignore the wake up indication if the respective one of the at least one other UE is outside a communication range.

Clause 50. The method of clause 49, wherein the wake up indication indicates the communication range for the respective one of the at least one other UE.

Clause 51. The method of any one of clauses 28-50, wherein: the monitoring for the at least one wake up indication comprises monitoring for the at least one wake up indication in a first sidelink bandwidth part (BWP), the at least one wake up indication indicating that the UE is to receive signaling during the sidelink DRX on phase in a second sidelink BWP; and performing the one or more actions comprises communicating in the second sidelink BWP in accordance with the at least one wake up indication.

Clause 52. The method of clause 51, wherein the first sidelink BWP at least partially overlaps with the second sidelink BWP.

Clause 53. The method of any one of clauses 51-52, wherein the first sidelink BWP is non-overlapping with the second sidelink BWP.

Clause 54. A method for wireless communication by a user equipment (UE), comprising: determining one or more sidelink discontinuous reception (DRX) configurations associated with at least one communication on sidelink; determining a wake up indication configuration associated with the one or more sidelink discontinuous reception (DRX) configurations; deciding an action for a sidelink DRX on phase associated with the one or more sidelink DRX configurations; and transmitting based on the wake up indication configuration, to at least one other UE, at least one wake up indication indicating the action for the sidelink DRX on phase for at least one communication on the sidelink.

Clause 55. The method of clause 54, wherein the at least one wake up indication comprises a sequence indicating the action for the sidelink DRX on phase.

Clause 56. The method of any one of clauses 54-55, wherein the at least one wake up indication is included in at least one of sidelink control information (SCI) or a media access control (MAC) control element (CE) indicating the action for the sidelink DRX on phase or the sidelink DRX on phase associated with one of the one or more sidelink DRX configurations.

Clause 57. The method of any one of clauses 54-56, wherein deciding the action for the sidelink DRX on phase comprises deciding whether the UE is to wake up during the sidelink DRX on phase associated with one of the one or more sidelink DRX configurations.

Clause 58. The method of any one of clauses 54-57, further comprising waking up to transmit control information during the sidelink DRX on phase in accordance with the DRX on phase configuration or the at least one wake up indication.

Clause 59. The method of any one of clauses 54-58, wherein the at least one wake up indication indicates one or more parameters for receiving signaling during the DRX on phase.

Clause 60. The method of any one of clauses 54-59, wherein the at least one wake up indication is at least one code division multiplexed, frequency division multiplexed, or time division multiplexed with one or more other wake up indications from one or more other UEs.

Clause 61. The method of any one of clauses 54-60, wherein each of the at least one wake up indication comprises an identifier the UE.

Clause 62. The method of any one of clauses 54-61, wherein each of the at least one wake up indication indicates an active sidelink DRX on phase for each of a plurality of services, UE groups, or UE pairs.

Clause 63. The method of clause 62, wherein each of the at least one wake up indication comprises a sequence associated with the respective service, UE group, or UE pair.

Clause 64. The method of any one of clauses 62-63, further comprising communicating for the plurality of services via broadcast, communicating among each of the plurality of UE groups via groupcast, or communicating between each of the plurality UE pairs via unicast in accordance with the at least one wake up indication.

Clause 65. The method of any one of clauses 54-64, wherein the at least one wake up indication is included in at least one sidelink control information (SCI) or a media access control (MAC) control element (CE).

Clause 66. The method of any one of clauses 54-65, wherein the at least one wake up indication indicates location information associated with the UE.

Clause 67. The method of clause 66, wherein the at least one wake up indication indicates a communication range between the UE and a respective one of the at least one other UE.

Clause 68. The method of any one of clauses 54-67, wherein: the at least one wake up indication is transmitted in a first sidelink bandwidth part (BWP), the at least one wake up indication indicating that the at least one other UE is to receive signaling during the sidelink DRX on phase in a second sidelink BWP; and the method further comprising communicating with the at least one other UE in the second sidelink BWP in accordance with the at least one wake up indication.

Clause 69. The method of clause 68, wherein the first sidelink BWP at least partially overlaps with the second sidelink BWP.

Clause 70. The method of any one of clauses 68-69, wherein the first sidelink BWP is non-overlapping with the second sidelink BWP.

Clause 71: An apparatus, comprising: a memory comprising executable instructions; one or more processors configured to execute the executable instructions and cause the apparatus to perform a method in accordance with any one of Clauses 1-70.

Clause 72: An apparatus, comprising means for performing a method in accordance with any one of Clauses 1-70.

Clause 73: A non-transitory computer-readable medium comprising executable instructions that, when executed by one or more processors of an apparatus, cause the apparatus to perform a method in accordance with any one of Clauses 1-70.

Clause 74: A computer program product embodied on a computer-readable storage medium comprising code for performing a method in accordance with any one of Clauses 1-70.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal fast Fourier transform (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
  determining one or more sidelink discontinuous reception (DRX) configurations associated with at least one communication on a sidelink;
  determining a wake up indication configuration associated with the one or more sidelink DRX configurations;
  monitoring for at least one wake up indication from at least one other UE based on the wake up indication configuration, the at least one wake up indication indicating a sidelink DRX on (SL DRX on) phase associated with the one or more sidelink DRX configurations, the at least one wake up indication comprising multiple wake up indications from different UEs, the multiple wake up indications being transmitted using a same resource allocation or different resource allocations;

deciding an action for the SL DRX on phase based on the at least one wake up indication for the at least one communication on the sidelink; and performing the action in accordance with the decision.

2. The method of claim 1, wherein the at least one wake up indication comprises a sequence or at least one of sidelink control information (SCI) or a media access control (MAC) control element (CE) indicating the action for the SL DRX on phase or the SL DRX on phase associated with the one or more sidelink DRX configurations.

3. The method of claim 1, wherein the deciding the action for the SL DRX on phase comprises deciding whether the UE is to wake up to monitor for sidelink control information (SCI) during the SL DRX on phase associated with the one or more sidelink DRX configurations based on the at least one wake up indication.

4. The method of claim 1, wherein the deciding the action for the SL DRX on phase comprises deciding, based on a power saving configuration or a quality of service configuration, to skip or to enter the SL DRX on phase to monitor for sidelink control information (SCI) if no wake up indication is received.

5. The method of claim 1, wherein the multiple wake up indications are transmitted using the same resource allocation.

6. The method of claim 1, wherein the multiple wake up indications are transmitted using the different resource allocations.

7. The method of claim 6, wherein at least one of the multiple wake up indications indicates one or more parameters for receiving signaling during the SL DRX on phase.

8. The method of claim 6, wherein the multiple wake up indications are at least one of code division multiplexed, frequency division multiplexed, or time division multiplexed.

9. The method of claim 1, wherein the at least one wake up indication comprises an identifier of a respective one of the at least one other UE, and wherein performing the action comprises monitoring for signaling from the respective one of the at least one other UE based on the identifier.

10. The method of claim 1, wherein the at least one wake up indication indicates an active SL DRX on phase with respect to the at least one communication for a plurality of services, UE groups, or UE pairs.

11. The method of claim 1, wherein the at least one communication comprises communication for a plurality of services via broadcast, communication among each of a plurality of UE groups via groupcast, or communication between each of a plurality UE pairs via unicast in accordance with the at least one wake up indication.

12. The method of claim 1, wherein the at least one wake up indication indicates at least location information associated with a respective one of the at least one other UE.

13. The method of claim 12, wherein the deciding the action comprises determining, based on the at least location information, to ignore the at least one wake up indication if the respective one of the at least one other UE is outside a communication range.

14. The method of claim 13, wherein the at least one wake up indication indicates the communication range for the respective one of the at least one other UE.

15. The method of claim 1, wherein:
the monitoring for the at least one wake up indication comprises monitoring for the at least one wake up indication in a first sidelink bandwidth part (BWP), the at least one wake up indication indicating that the UE is to receive signaling during the SL DRX on phase in a second sidelink BWP; and performing the action comprises communicating in the second sidelink BWP in accordance with the at least one wake up indication.

16. The method of claim 15, wherein the first sidelink BWP is a default or common sidelink BWP.

17. A method for wireless communication by a user equipment (UE), comprising:
determining one or more sidelink discontinuous reception (DRX) configurations associated with at least one communication on a sidelink;

determining a wake up indication configuration associated with the one or more sidelink DRX configurations;

deciding an action for a sidelink DRX on (SL DRX on) phase associated with the one or more sidelink DRX configurations; and transmitting, based on the wake up indication configuration and to at least one other UE, at least one wake up indication indicating the action for the SL DRX on phase for at least one communication on the sidelink, the at least one wake up indication comprising multiple wake up indications to different UEs, the multiple wake up indications being transmitted using a same resource allocation or different resource allocations.

18. The method of claim 17, wherein the at least one wake up indication comprises a sequence or at least one of sidelink control information (SCI) or a media access control (MAC) control element (CE) indicating the action for the SL DRX on phase or the SL DRX on phase associated with the one or more sidelink DRX configurations.

19. The method of claim 17, wherein the deciding the action for the SL DRX on phase comprises deciding whether the UE is to wake up to monitor for sidelink control information (SCI) during the SL DRX on phase associated with the one or more sidelink DRX configurations.

20. The method of claim 17, further comprising transmitting sidelink control information (SCI) during the SL DRX on phase in accordance with the one or more sidelink DRX configurations or the at least one wake up indication.

21. The method of claim 17, wherein the at least one wake up indication indicates one or more parameters for receiving signaling during the SL DRX on phase.

22. The method of claim 17, wherein the at least one wake up indication comprises an identifier of the UE.

23. The method of claim 17, further comprising communicating for a plurality of services via broadcast, communicating among each of a plurality of UE groups via groupcast, or communicating between each of a plurality UE pairs via unicast in accordance with the at least one wake up indication.

24. The method of claim 17, wherein the at least one wake up indication indicates at least location information associated with the UE.

25. The method of claim 24, wherein the at least one wake up indication indicates a communication range between the UE and a respective one of the at least one other UE.

26. The method of claim 17, wherein:
the at least one wake up indication is transmitted in a first sidelink bandwidth part (BWP), the at least one wake up indication indicating that the at least one other UE is to receive signaling during the SL DRX on phase in a second sidelink BWP; and the method further comprises communicating with the at least one other UE in the second sidelink BWP in accordance with the at least one wake up indication.

27. The method of claim 26, wherein the first sidelink BWP is a default or common sidelink BWP.

28. An apparatus for wireless communication, comprising:
a memory comprising executable instructions; and
one or more processors configured to execute the executable instructions and cause the apparatus to:
determine one or more sidelink discontinuous reception (DRX) configurations associated with at least a communication on a sidelink;
determine a wake up indication configuration associated with the one or more sidelink DRX configurations;
monitor for at least one wake up indication from at least one other UE based on the wake up indication configuration, the at least one wake up indication indicating a sidelink DRX on (SL DRX on) phase associated with the one or more sidelink DRX configurations, the at least one wake up indication comprising multiple wake up indications from different UEs, the multiple wake up indications being transmitted using a same resource allocation or different resource allocations;
decide an action for the SL DRX on phase based on the at least one wake up indication for the at least one communication on the sidelink; and
perform the action in accordance with the decision.

29. An apparatus for wireless communication, comprising:
a memory comprising executable instructions; and
one or more processors configured to execute the executable instructions and cause the apparatus to:
determine one or more sidelink discontinuous reception (DRX) configurations associated with at least one communication on sidelink;
determine a wake up indication configuration associated with the one or more sidelink DRX configurations;
decide an action for a sidelink DRX on (SL DRX on) phase associated with the one or more sidelink DRX configurations; and
transmit, based on the wake up indication configuration and to at least one other UE, at least one wake up indication indicating the action for the SL DRX on phase for at least one communication on the sidelink, the at least one wake up indication comprising multiple wake up indications to different UEs, the multiple wake up indications being transmitted using a same resource allocation or different resource allocations.

* * * * *